(12) United States Patent
Peroz et al.

(10) Patent No.: US 12,216,242 B2
(45) Date of Patent: Feb. 4, 2025

(54) HYBRID POLYMER WAVEGUIDE AND METHODS FOR MAKING THE SAME

(71) Applicant: Magic Leap, Inc., Plantation, FL (US)

(72) Inventors: Christophe Peroz, Tokyo (JP); Chieh Chang, Cedar Park, TX (US); Sharad D. Bhagat, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/902,729

(22) Filed: Sep. 2, 2022

(65) Prior Publication Data

US 2022/0413185 A1 Dec. 29, 2022

Related U.S. Application Data

(63) Continuation of application No. 17/044,798, filed as application No. PCT/US2019/025224 on Apr. 1, 2019, now Pat. No. 11,460,609.

(Continued)

(51) Int. Cl.
*G02B 1/04* (2006.01)
*G02B 5/18* (2006.01)
(Continued)

(52) U.S. Cl.
CPC ............ *G02B 1/046* (2013.01); *G02B 1/048* (2013.01); *G02B 5/1819* (2013.01);
(Continued)

(58) Field of Classification Search
CPC ...... G02B 1/046; G02B 1/048; G02B 5/1819; G02B 5/1842; G02B 27/0172;
(Continued)

(56) References Cited

U.S. PATENT DOCUMENTS 6,542,684 B2 4/2003 Eldada et al.
6,850,221 B1 2/2005 Tickle
(Continued)

FOREIGN PATENT DOCUMENTS

CN 103823267 A * 5/2014 ......... G02B 27/0101
JP 2007017521 A 1/2007
(Continued)

OTHER PUBLICATIONS

CN-103823267-A (English Translation) (Year: 2014).*
(Continued)

*Primary Examiner* — Jerry Rahll
*Assistant Examiner* — Mary A El-Shammaa
(74) *Attorney, Agent, or Firm* — Tobias Intellectual Property Law, PLLC

(57) ABSTRACT

In some embodiments, a head-mounted augmented reality display system comprises one or more hybrid waveguides configured to display images by directing modulated light containing image information into the eyes of a viewer. Each hybrid waveguide is formed of two or more layers of different materials. The thicker of the layers is a highly optically transparent "core" layer, and the thinner layer comprises a pattern of protrusions and indentations to form, e.g., a diffractive optical element. The pattern may be formed by imprinting. The hybrid waveguide may include additional layers, e.g., forming a plurality of alternating core layers and thinner patterned layers. Multiple waveguides may be stacked to form an integrated eyepiece, with each waveguide configured to receive and output light of a different component color.

19 Claims, 26 Drawing Sheets

Related U.S. Application Data

(60) Provisional application No. 62/651,507, filed on Apr. 2, 2018.

(51) Int. Cl.
*G02B 27/00* (2006.01)
*G02B 27/01* (2006.01)

(52) U.S. Cl.
CPC ....... *G02B 5/1842* (2013.01); *G02B 27/0081* (2013.01); *G02B 27/0101* (2013.01); *G02B 27/0172* (2013.01); *G02B 2027/0125* (2013.01); *G02B 2027/0174* (2013.01); *G02B 2027/0178* (2013.01)

(58) Field of Classification Search
CPC .... G02B 2027/0125; G02B 2027/0174; G02B 2027/0178
See application file for complete search history.

(56) References Cited

U.S. PATENT DOCUMENTS

| | | | |
|---|---|---|---|
| 7,248,773 | B2 | 7/2007 | Chang et al. |
| 8,411,536 | B1 | 4/2013 | Peng |
| 8,503,841 | B2 | 8/2013 | Kopp et al. |
| 10,042,096 | B2 | 8/2018 | Simmonds et al. |
| 11,460,609 | B2 | 10/2022 | Peroz et al. |
| 2006/0028436 | A1 | 2/2006 | Armstrong |
| 2007/0081123 | A1 | 4/2007 | Lewis |
| 2008/0031584 | A1 | 2/2008 | Payne |
| 2009/0141324 | A1 | 6/2009 | Mukawa |
| 2012/0127062 | A1 | 5/2012 | Bar-Zeev et al. |
| 2012/0162549 | A1 | 6/2012 | Gao et al. |
| 2013/0082922 | A1 | 4/2013 | Miller et al. |
| 2013/0117377 | A1 | 5/2013 | Miller |
| 2013/0125027 | A1 | 5/2013 | Abovitz et al. |
| 2013/0208234 | A1 | 8/2013 | Lewis |
| 2013/0242262 | A1 | 9/2013 | Lewis et al. |
| 2014/0071539 | A1 | 3/2014 | Gao et al. |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao et al. |
| 2016/0026253 | A1 | 1/2016 | Bradski et al. |
| 2016/0216416 | A1 | 7/2016 | Tekolste et al. |
| 2016/0306258 | A1* | 10/2016 | Mazur ................... G02F 1/3544 |
| 2017/0059892 | A1 | 3/2017 | Jain |
| 2017/0322418 | A1 | 11/2017 | Lin et al. |
| 2018/0011324 | A1 | 1/2018 | Popovich et al. |
| 2018/0029319 | A1 | 2/2018 | Kalima et al. |
| 2018/0031584 | A1 | 2/2018 | Porter et al. |
| 2021/0157032 | A1 | 5/2021 | Peroz |
| 2022/0413185 | A1 | 12/2022 | Peroz et al. |

FOREIGN PATENT DOCUMENTS

| | | | | |
|---|---|---|---|---|
| JP | 4450058 | B2 | 4/2010 | |
| JP | 2017502348 | B | 11/2018 | |
| JP | 2018506068 | B | 8/2020 | |
| WO | 2013027006 | A1 | 2/2013 | |
| WO | WO-2016113534 | A1 * | 7/2016 | ......... G02B 27/0101 |
| WO | 2016123145 | A1 | 8/2016 | |
| WO | WO 2016/123145 | | 8/2016 | |
| WO | 2016141372 | A1 | 9/2016 | |
| WO | 2017197020 | A1 | 11/2017 | |
| WO | 2019195186 | A1 | 10/2019 | |
| WO | WO 2019/195186 | | 10/2019 | |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "a Survey of Augmented Reality," Teleoperators and Virtual Environments 6, Aug. 4, 1997, pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/ raskar/book/BlmberRaskarAugmentedRealltyBook.pdf.

International Preliminary Report for Patentability, re PCT Application No. PCT/US2019/025224, dated Oct. 6, 2020.

International Search Report and Written Opinion, re PCT Application No. PCT/US2019/025224, dated Aug. 2, 2019.

Jacob, "Eye fracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

JP2020-551858 Office Action dated Mar. 16, 2023.

International Search Report and Written Opinion, re PCT Application No. PCT/US2019/025224, mailed Aug. 2, 2019.

International Preliminary Report for Patentability, re PCT Application No. PCT/US2019/025224, issued Oct. 15, 2020.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

JP2023098443 Office Action mailed Apr. 24, 2024.

* cited by examiner

FIG. 15A
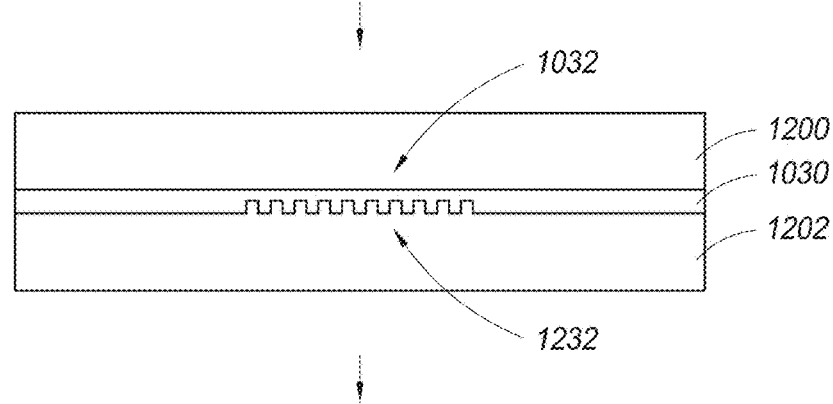
FIG. 15B
FIG. 15C
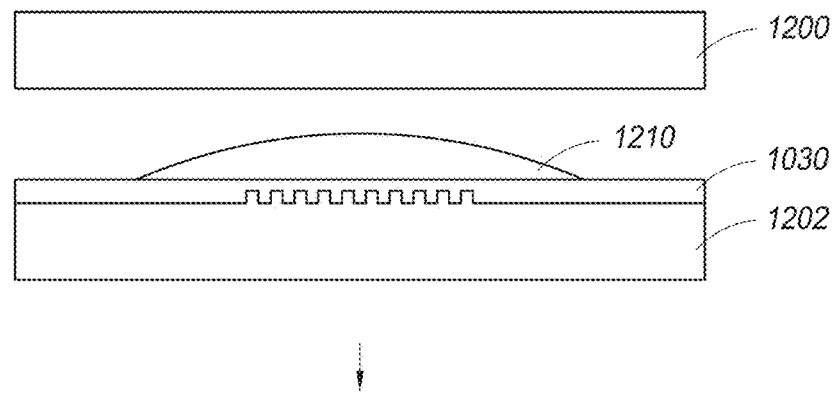
FIG. 15D
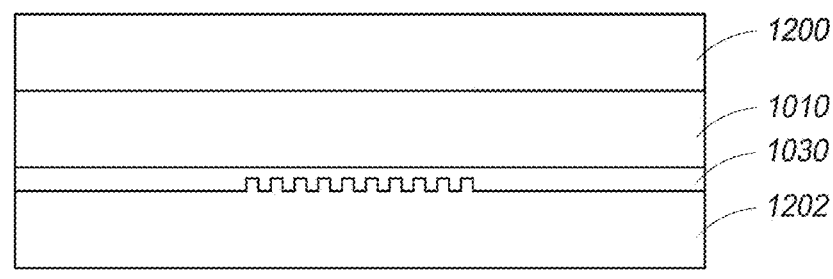
FIG. 15E
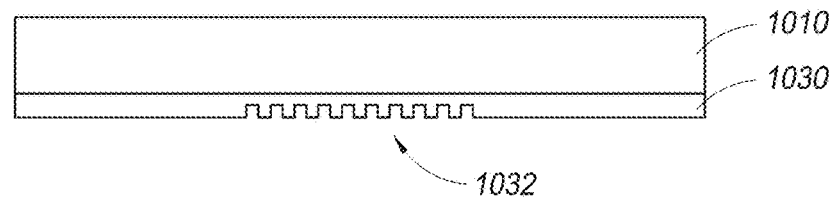

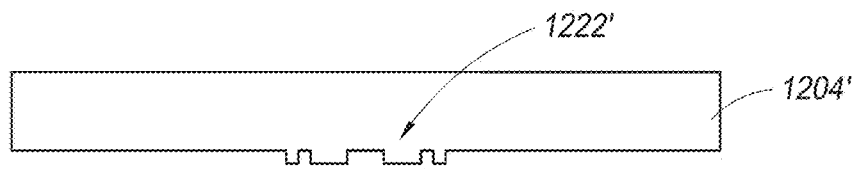
FIG. 18A
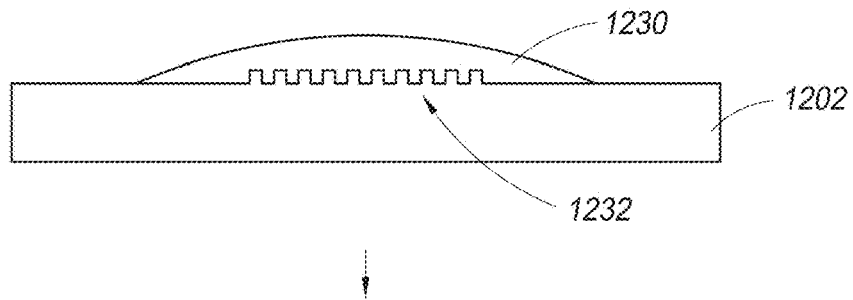
FIG. 18B
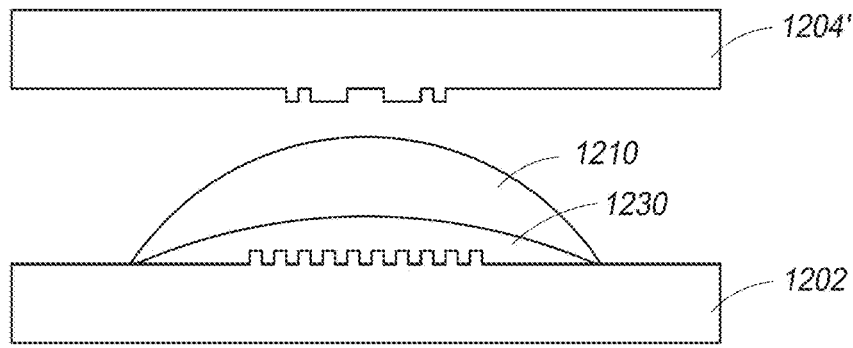
FIG. 18C
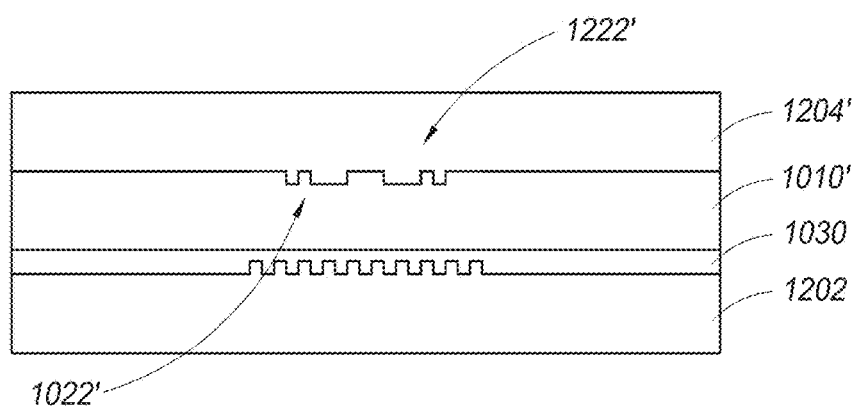
FIG. 18D

HYBRID POLYMER WAVEGUIDE AND METHODS FOR MAKING THE SAME

CROSS-REFERENCE TO RELATED APPLICATIONS

This application is a continuation of U.S. patent application Ser. No. 17/044,798 filed on Oct. 1, 2020, which is titled "HYBRID POLYMER WAVEGUIDE AND METHODS FOR MAKING THE SAME," which is a US national phase under 35 U.S.C. § 371 of International Patent Application No. PCT/US2019/025224 filed on Apr. 1, 2019, which claims priority to U.S. Patent Prov. App. 62/651,507, which is titled "HYBRID POLYMER WAVEGUIDE AND METHODS FOR MAKING THE SAME" and was filed on Apr. 2, 2018 and is incorporated herein by reference in its entirety.

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, an optical device is provided. The optical device comprises a waveguide. The waveguide comprises: an optically transmissive core layer having a major surface opposite an other major surface; and an optically transmissive auxiliary layer on the major surface, the auxiliary layer having a nanophotonic structure. The auxiliary layer is thinner than the core layer and is formed of a material different from material forming the core layer.

In some other embodiments, an optical system is provided. The optical system comprises a set of stacked, spaced-apart waveguides. At least one of the waveguides comprises: an optically transmissive core layer having a major surface opposite an other major surface; and an optically transmissive auxiliary layer on the major surface. The auxiliary layer comprises a nanophotonic structure. The auxiliary layer is thinner than the core layer and is formed of a material different from material forming the core layer.

In yet other embodiments, a method for making an optical device is provided. The method comprises forming a waveguide. Forming the waveguide comprises providing upper and lower imprint molds, wherein the imprint molds face one another. A first polymer material is provided between the imprint molds. A second polymer material is provided over the first polymer material and between the imprint molds. The second polymer material is in the liquid state. The second polymer material is contacted with the upper imprint mold. The first polymer material and the second polymer material is exposed to a hardening process. The first polymer material forms a first layer and the second polymer material forms a second layer. The upper imprint mold is then removed.

In addition, various examples of embodiments are provided below.

Example 1: An optical device comprising:
  a waveguide comprising:
    an optically transmissive core layer having a major surface opposite an other major surface; and
    an optically transmissive auxiliary layer on the major surface, the auxiliary layer having a nanophotonic structure,
    wherein the auxiliary layer is thinner than the core layer and is formed of a material different from material forming the core layer.

Example 2: The optical device of Example 1, wherein the nanaphotonic structure comprises an optical grating.

Example 3: The optical device of any of Examples 1 to 2, wherein the core layer and the auxiliary layer are each formed of a polymer or a resin.

Example 4: The optical device of any of Examples 1 to 3, wherein material forming the auxiliary layer has a refractive index differing by about 0.05 or more from the refractive index of material forming the core layer.

Example 5: The optical device of any of Examples 1 to 4, wherein the core layer has a thickness of 100-5000 μm, and the auxiliary layer has a thickness of between 0.01-5 μm.

Example 6: The optical device of any of Examples 1 to 5, further comprising an additional auxiliary layer thinner than the core layer and immediately adjacent the other major surface Example 7: The optical device of Example 6, wherein the additional auxiliary layer comprises an optical grating.

Example 8: The waveguide of any of Examples 1 to 7, further comprising an additional core layer disposed on an opposite side of the auxiliary layer from the core layer.

Example 9: The optical device of any of Examples 1 to 8, further comprising a plurality of core layers alternating with auxiliary layers thinner than the core layers, the auxiliary layers formed of material different from the core layers.

Example 10: The optical device of Example 9, wherein the core layers are formed of a same material.

Example 11: The optical device of any of Examples 9 to 10, wherein the auxiliary layers are formed of a same material.

Example 12: The optical device of any of Examples 9 to 11, wherein one or more of the auxiliary layers comprise optical gratings different from one or more other auxiliary layers.

Example 13: An optical system comprising:
  a set of stacked, spaced-apart waveguides, at least one of the waveguides comprising:
    an optically transmissive core layer having a major surface opposite an other major surface; and
    an optically transmissive auxiliary layer on the major surface, the auxiliary layer comprising a nanophotonic structure,
    wherein the auxiliary layer is thinner than the core layer and is formed of a material different from material forming the core layer.

Example 14: The optical system of Example 13, wherein each waveguide is separated by an air gap.

Example 15: The optical system of any of Examples 13 to 14, wherein each waveguide is spaced apart by one or more spacers disposed between the waveguides.

Example 16: The optical system of any of Examples 13 to 15, wherein each of the waveguides comprises a core layer and an auxiliary layer, wherein the one or more spacers are integral with one of the core layer or auxiliary layer.

Example 17: The optical system of any of Examples 13 to 16, wherein each of the waveguides comprises a core layer and an auxiliary layer, wherein a core layer of each waveguide is formed of a different material from core layers of other waveguides of the set of stacked, spaced-apart waveguides.

Example 18: The optical system of any of Examples 13 to 17, wherein the optical system is an augmented reality system, and further comprises:
  a spatial light modulator configured to provide modulated light containing image information to the waveguides,
  wherein each waveguide comprises a plurality of nanophotonic structures, wherein the nanophotonic structure comprise:
    incoupling diffractive optical elements configured to direct the modulated light into the waveguide; and
    outcoupling diffractive optical elements configured to extract incoupled modulated light out of the waveguide.

Example 19: The optical system of Example 18, wherein the spatial light modulator is part of a light projection system configured to project images onto the incoupling diffractive optical elements.

Example 20: The optical system of any of Examples 18 to 19, wherein the spatial light modulator modulates light for a scanning fiber display.

Example 21: The optical system of any of Examples 13 to 20, further comprising a plurality of sets of stacked, space-apart waveguides, wherein each waveguide comprises:
  an optically transmissive core layer having a major surface opposite an other major surface; and
  an optically transmissive auxiliary layer on the major surface, the auxiliary layer comprising a nano for public structure
  wherein the auxiliary layer is thinner than the core layer and is formed of a material different from material forming the core layer.

Example 22: A method for making an optical device, the method comprising:
  forming a waveguide comprising:
    providing upper and lower imprint molds, wherein the imprint molds face one another;
    providing a first polymer material between the imprint molds;
    providing a second polymer material over the first polymer material and between the imprint molds, wherein the second polymer material is in the liquid state;
    contacting the second polymer material with the upper imprint mold;
    exposing the first polymer material and the second polymer material to a hardening process, wherein the first polymer material forms a first layer and the second polymer material forms a second layer; and
    removing the upper imprint mold.

Example 23: The method of Example 22, wherein the upper imprint mold comprises a pattern of protrusions and indentations, wherein contacting the second polymer material with the upper imprint mold transfers a corresponding pattern of protrusions and indentations into the second polymer material.

Example 24: The method of any of Examples 22 to 23, wherein the lower imprint mold comprises a pattern of protrusions and indentations, and wherein the first layer comprises a matching pattern of protrusions and indentations.

Example 25: The method of any of Examples 22 to 24, wherein the first polymer material is in the liquid state.

Example 26: The method of any of Examples 22 to 25, wherein providing the first polymer material comprises:
  providing the first polymer material between the lower imprint mold and an additional imprint mold;
  compressing the first polymer material between the lower imprint mold and the additional imprint mold; and
  hardening the first polymer material between the lower imprint mold and the additional imprint mold,
  wherein providing upper and lower imprint molds comprises:
    removing the additional imprint mold; and
    disposing the upper imprint mode over the first polymer material.

Example 27: The method of any of Examples 22 to 26, wherein exposing the first and second polymer material to a hardening process comprises exposing the first and second polymer material to ultraviolet light.

Example 28: The method of any of Examples 22 to 27, further comprising:
  depositing a third polymer material on the second layer of the second polymer material;
  contacting the third polymer material with a third polymer material mold;
  hardening the third polymer material to form a third layer of the third polymer material; and
  removing the third polymer material mold.

Example 29: The method of Example 28, further comprising:
  depositing a fourth polymer material on the third layer;
  contacting the fourth polymer material with a fourth polymer material mold;
  hardening the fourth polymer material to form a fourth layer formed of the fourth polymer material; and
  removing the fourth polymer material mold.

Example 30: The method of Example 29, further comprising:
  depositing a fifth polymer material on the fourth layer;
  contacting the fifth polymer material with a fifth polymer material mold;
  hardening the fifth polymer material to form a fifth layer formed of the fifth polymer material; and
  removing the fifth polymer material mold.

Example 31: The method of Example 30, wherein the first, third, and fifth polymer materials are a same material.

Example 32: The method of any of Examples 29 to 31, wherein the second and fourth polymer materials are a same material.

Example 33: The method of any of Examples 30 to 32, wherein the first, third, and fifth layers comprise a pattern of protrusions and indentations forming diffractive optical elements.

Example 34: The method of any of the Examples 22 to 33, further comprising:
  forming a waveguide comprising alternating layers of polymer material, wherein every other layer of the alternating layers comprises a pattern of protrusions and indentations; and
  affixing the additional waveguide to the waveguide, wherein the additional waveguide and the waveguide are separated by a gap.

BRIEF DESCRIPTION OF THE DRAWINGS

FIGS. 15a-15e illustrate a method of forming a hybrid waveguide with a core layer and an auxiliary layer.

FIGS. 18a-18d illustrate a method of forming a hybrid waveguide with a patterned core layer and an auxiliary layer.

DETAILED DESCRIPTION

Figure 1:
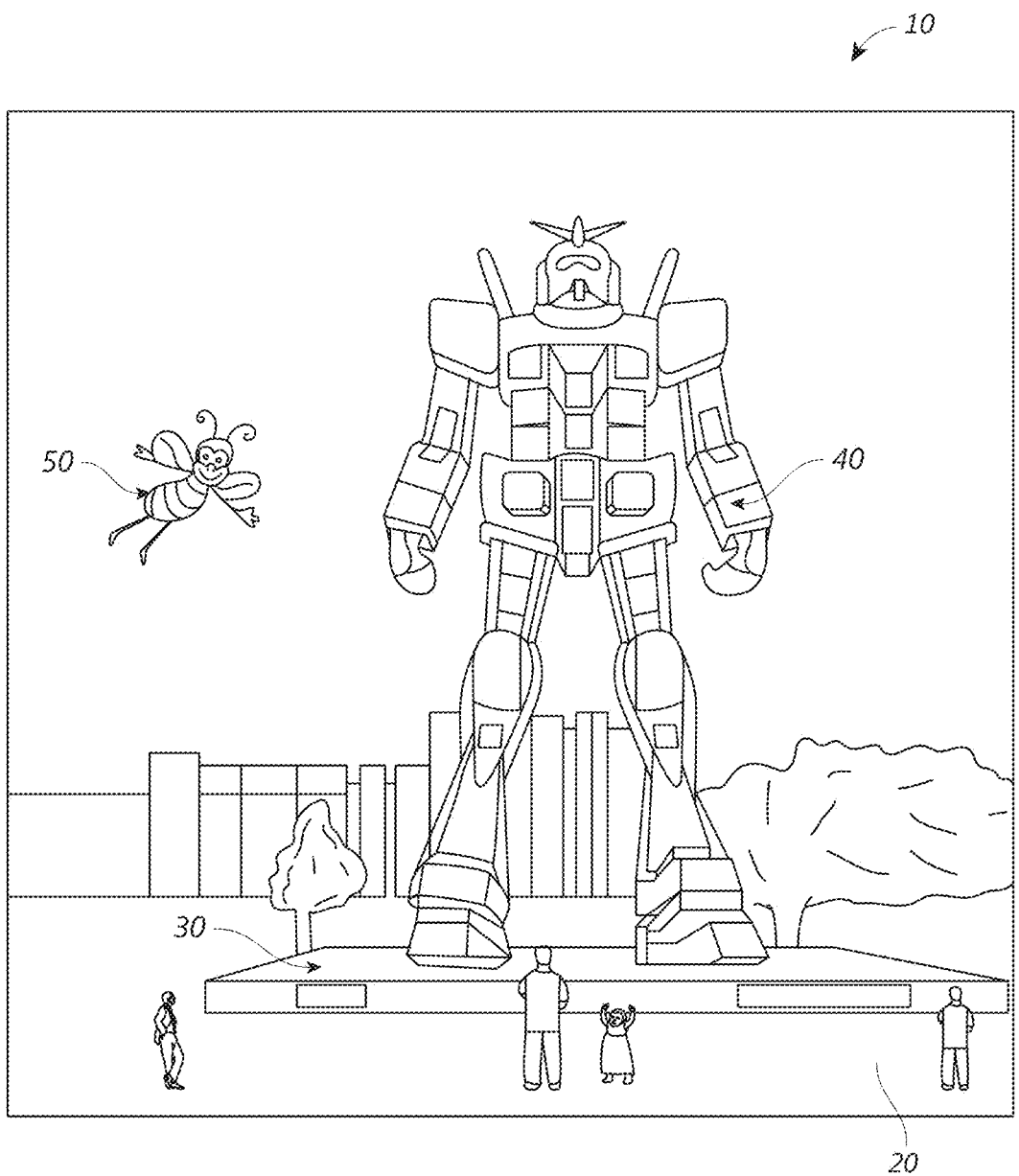
FIG. 1 illustrates a user's view of augmented reality (AR) through an AR device.

Waveguides may be utilized to direct light, such as in display devices including head-mounted augmented reality display systems. For example, the waveguides may be incorporated into eyewear and the viewer may see the ambient environment through the waveguides. In addition, the waveguides may display images by receiving light containing image information and directing that light into the eyes of a viewer. The received light may be incoupled into the waveguides using nanophotonic structures such as diffractive optical elements. The incoupled light may subsequently be outcoupled out of the waveguides also using nanophotonic structures such as diffractive optical elements. The nanophotonic structures may take the form of indentations and protrusions in the waveguide.

It has been found, however, that the requirements for forming and supporting the functionality of the nanophotonic structures may be in tension with requirements for forming a waveguide that has desired properties for propagating light. For example, a material with a high refractive index at the interface where light is outcoupled out of the waveguide is beneficial for providing a display with a large field of view, and for providing a waveguide with high compactness and highly efficient light outcoupling and incoupling. In addition, the waveguide is preferably highly transparent and homogeneous, to limit optical losses for light propagating within it, and preferably can also be formed on a bulk scale, that is, to a thickness and area suitable for a waveguide. Undesirably, it has been found that materials with high transparency and homogeneity and that are formable on a bulk scale may not have desired high refractive indices, and conversely materials with high refractive indices may not have the desired high transparency and homogeneity, and ease of being formed on the bulk scale, for use to form a waveguide.

Advantageously, in some embodiments, a hybrid waveguide is provided with multiple layers of different materials. For example, the hybrid waveguide may include a core layer and an auxiliary layer. Preferably, the core layer is formed of a highly transparent material and the auxiliary layer is formed of a thinner layer of material, in which nanophotonic structures are provided. In some embodiments, the material forming the core layer is a highly transparent polymer, e.g., having a transparency relay transmission of greater than 85%, greater than 90%, or greater than 96% in the visible light spectrum across the thickness of the core layer. The material may be a flowable material (e.g., a flowable polymer) which may be flowed onto a surface and subsequently hardened, e.g., by curing. The auxiliary layer may be thinner than the core layer and is preferably formed of a different material than the core layer. For example, the core layer may have a thickness of between about 100 μm and 1000 μm, and the auxiliary layer may have a thickness of between about 5 nm and about 5000 nm (0.01 μm to about 5 μm), including about 50 nm to about 5000 nm. In some embodiments, the auxiliary layer is formed of a polymer (e.g., an organic polymer), an inorganic material, a hybrid organic/inorganic material, or combinations thereof. In some embodiments, for a given thickness, the auxiliary layer may have lower transparency in the visible spectrum and/or have lower homogeneity (in composition and/or optical properties such as transparency) than the core layer. However, this lower transparency may be ameliorated by the relative thinness of the auxiliary layer in comparison to the core layer.

Preferably, the hybrid waveguide is formed of material with high refractive indices, which may provide an advantageously large field of view for display devices utilizing the core layer in the waveguide. In some embodiments, the materials forming the core layer and auxiliary layer may have a refractive index of about 1.65 or more, about 1.70 or more, or about 1.80 or more. In addition, the auxiliary layer may be formed of a material with a different refractive index than the core layer. It will be appreciated that differences in refractive indices at an interface between nanophotonic structures and another material can facilitate the ability of the nanophotonic structure to redirect light. In some embodiments, the nanophotonic structures comprise indentations filled with another material. For example, the other material may be a subsequently formed core layer. In some embodiments, the material forming the auxiliary layer has a refractive index that differs from the refractive index of the material filling the indentations of the nanophotonic structures by about 0.05 or more, about 0.1 or more, or about 0.2 or more. In some embodiments, the material filling the indentations of the nanophotonic structures may be the material of a core layer formed after forming the nanophotonic structures in the auxiliary layer. In some embodiments, the material forming the auxiliary layer has a refractive index that differs from the material forming the core layer, which fills the indentations of the nanophotonic structure, by about 0.05 or more, about 0.1 or more, or about 0.2 or more. In some embodiments, the refractive index of the material forming the auxiliary layer may be higher than that of the core layer filling the indentations and may be about 1.65 or more, about 1.70 or more, or about 1.80 or more. In some other embodiments, the refractive index of the material forming the auxiliary layer may be lower than that of the core layer filling the indentations.

The nanophotonic structures may take the form of repeating lines of material with intervening indentations or open volumes in the auxiliary layer. In some embodiments, the nanophotonic structures have critical dimensions (e.g., the widths of the lines of material) that are less than the wavelength of light in the visible spectrum. The nanophotonic structures may be surface relief features, including diffractive optical elements such as diffractive gratings. In some embodiments, the nanophotonic structures may be a meta-surface. The nanophotonic structures may include features that extend partially or completely through the auxiliary layer. In some embodiments, one or more of the nanophotonic structures may extend into an immediately neighboring core layer. The core layer may provide additional flexibility to form features of desired sizes, depending, for example, on the desired optical functionality. For example, the indentations between lines of materials in the auxiliary layer may extend into the core layer to form features in the nanophotonic structure with larger aspect ratios than would be possible if those features are formed only using the auxiliary layer.

Advantageously, the use of layers of different materials as disclosed herein allows the functionality of a layer to be better matched with the material forming that layer. For example, the core layer may be formed of a homogeneous, highly transparent material. In addition, the material forming the core layer may be readily processed to form a thick layer while maintaining the desired homogeneity and transparency. In some embodiments, such a material may be relatively soft or pliable. On the other hand, the auxiliary layers may be formed of material having a sufficiently large refractive index difference with the core layer to allow the formation of diffractive optical elements with the light redirecting capabilities as disclosed. As discussed herein, the refractive index of the material forming the auxiliary layer is preferably different than that of the core layer. In addition, the auxiliary layer material may be mechanically hard and/or strong (e.g., mechanically harder or stronger than the core layer). In some embodiments, a relatively thick core layer may be utilized to provide light propagation with little optical loss, while a relatively thin auxiliary layer having a high refractive index is utilized to form photonic structures and to also mechanically protect/or reinforce the core layer.

The provision of separate and auxiliary layers advantageously allows additional functionality to be achieved. For example, in some embodiments, the waveguide may comprise multiple core and/or auxiliary layers. For example, the core layer may be provided with auxiliary layers on either side of it, e.g., on top and bottom major surfaces, or two core layers may be provided, one on either side of an auxiliary layer. In yet other embodiments, auxiliary layers may be provided alternating with core layers. The ability to provide multiple auxiliary layers can advantageously provide additional optical functionality. For example, different auxiliary layers may have different nanophotonic structures, which may be configured to provide different optical functionality. In some embodiments, different nanophotonic structures to be configured to address the shortcomings of other nanophotonic structures, such that the aggregate functionality of all of the nanophotonic structures is improved relative to a single structure. For example, some nanophotonic structures, such as optical gratings, may operate in a narrow band of wavelengths of light and/or incident angles. By utilizing multiple nanophotonic structures, each configured to operate in a slightly different band of wavelengths and/or incident angles, the aggregate bands of wavelengths of light and/or incident angles acted upon by the waveguide may be increased.

Reference will now be made to the drawings, in which like reference numerals refer to like parts throughout. Unless indicated otherwise, the drawings are schematic not necessarily drawn to scale.

Example Display Systems

Figure 2:
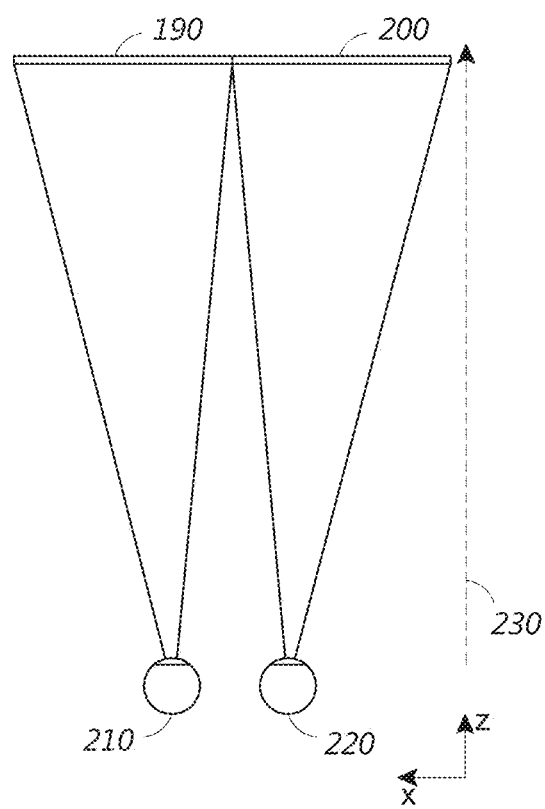
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
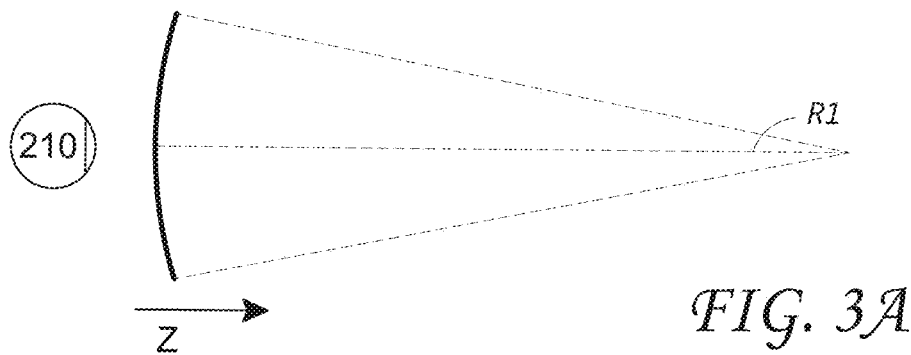
FIGS. 3A-3C illustrate relationships between radius of curvature and focal radius.
Figure 3B:
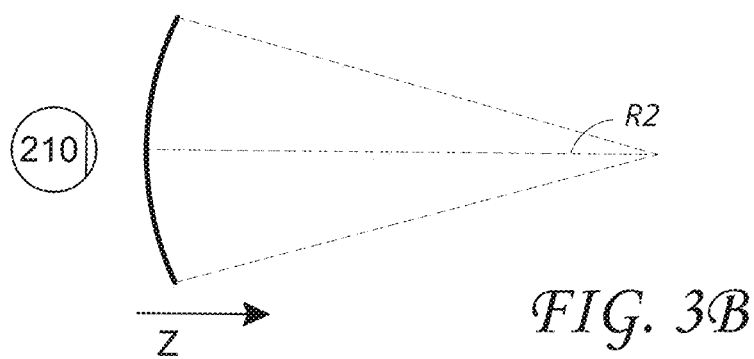
Figure 3C:
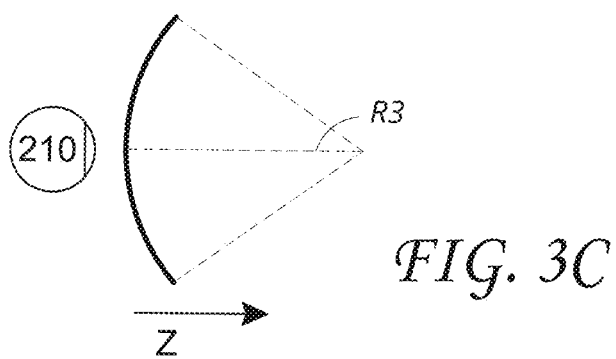

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
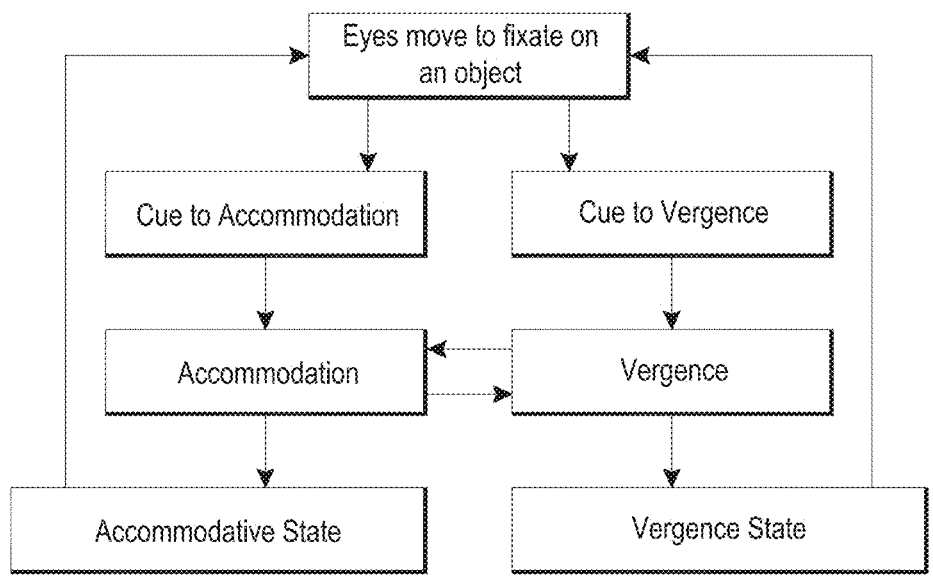
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
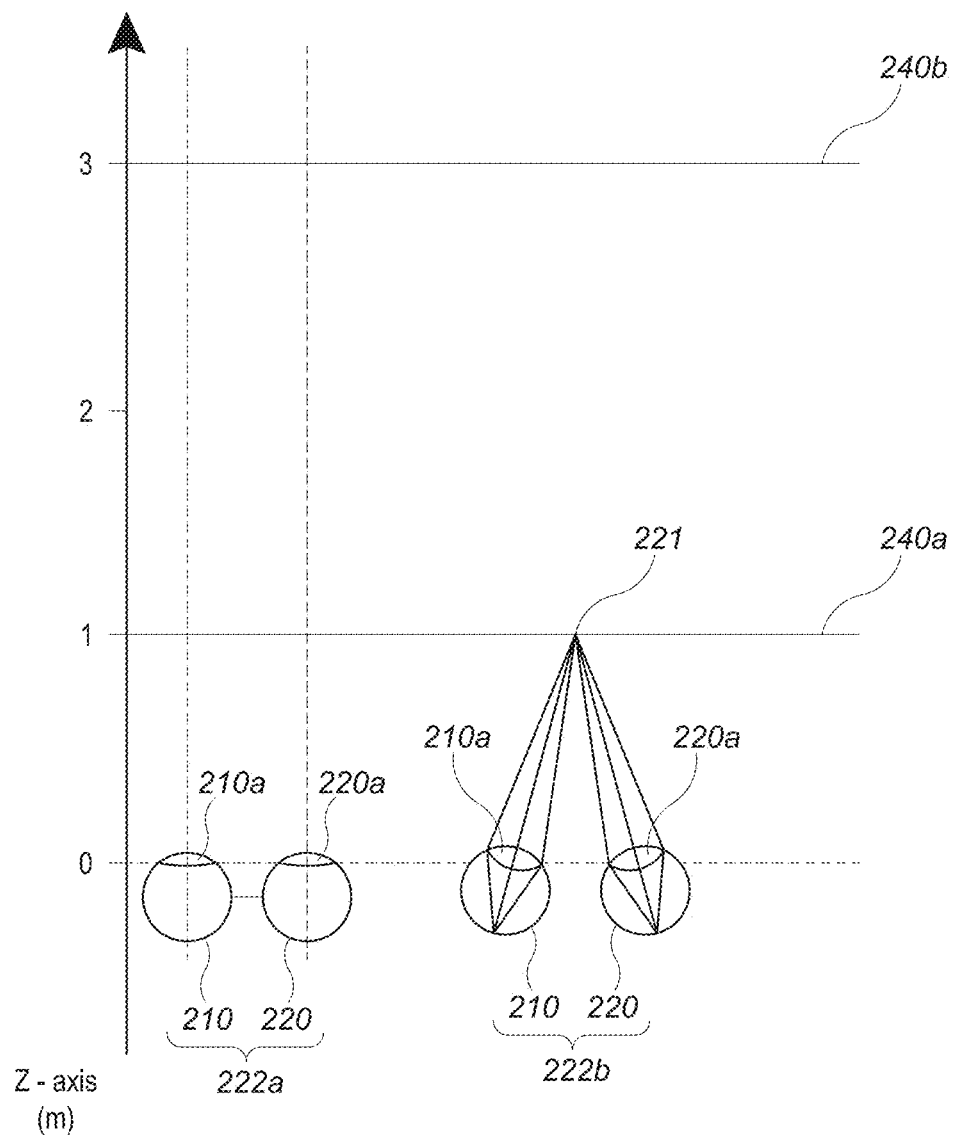
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
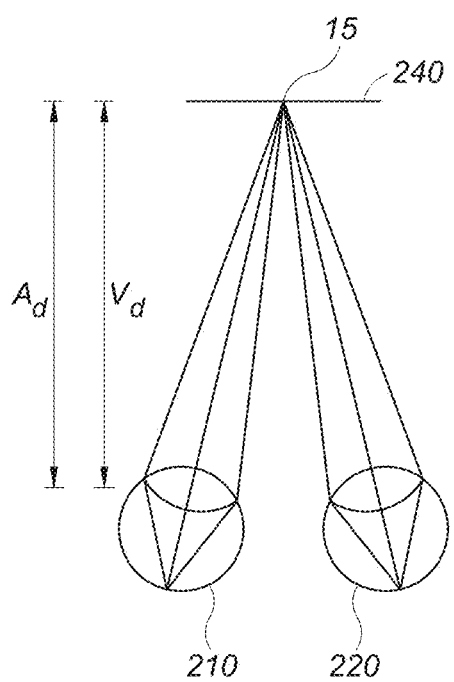
FIG. 4C illustrates an example of a representation of a top-down view of a user viewing content via a display system.
Figure 4D:
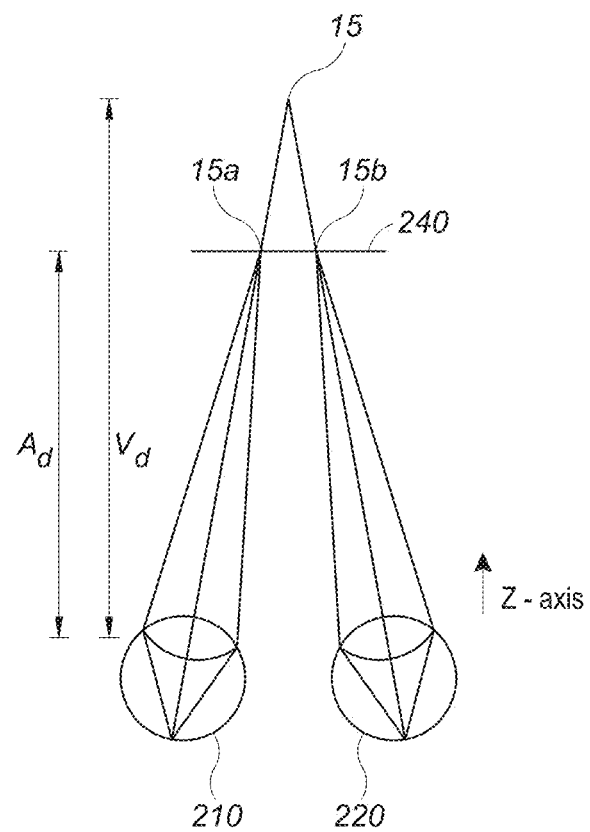
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, from the center of rotation of an eye, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
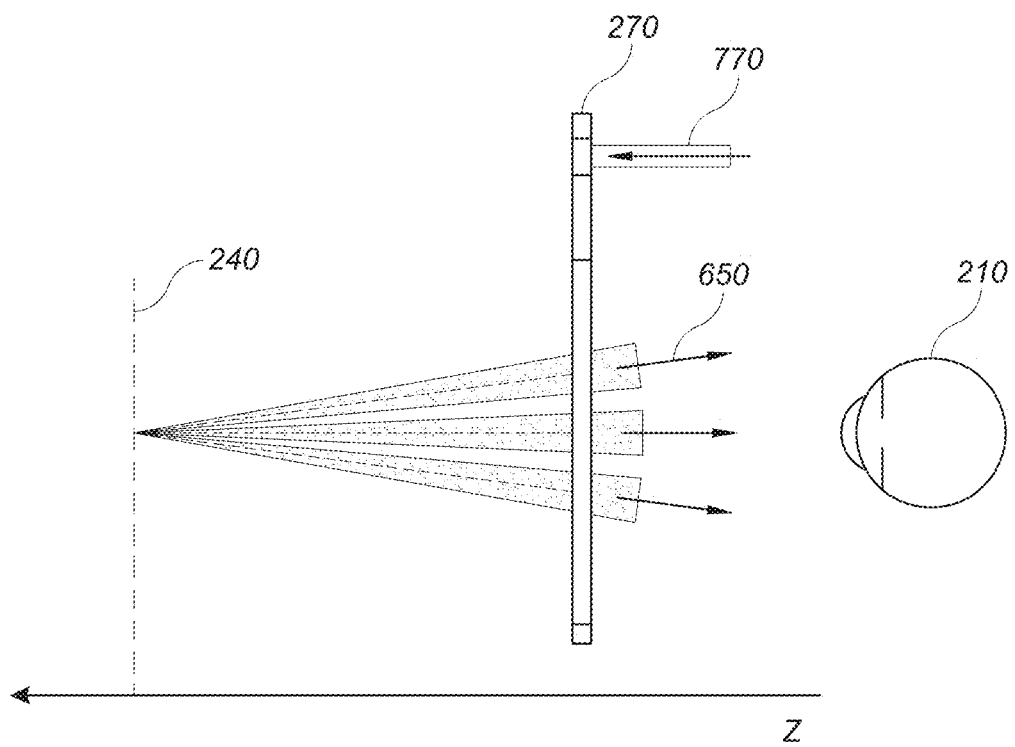
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated that a depth plane may follow the contours of a flat or a curved surface. In some embodiments, advantageously for simplicity, the depth planes may follow the contours of flat surfaces.

Figure 6:
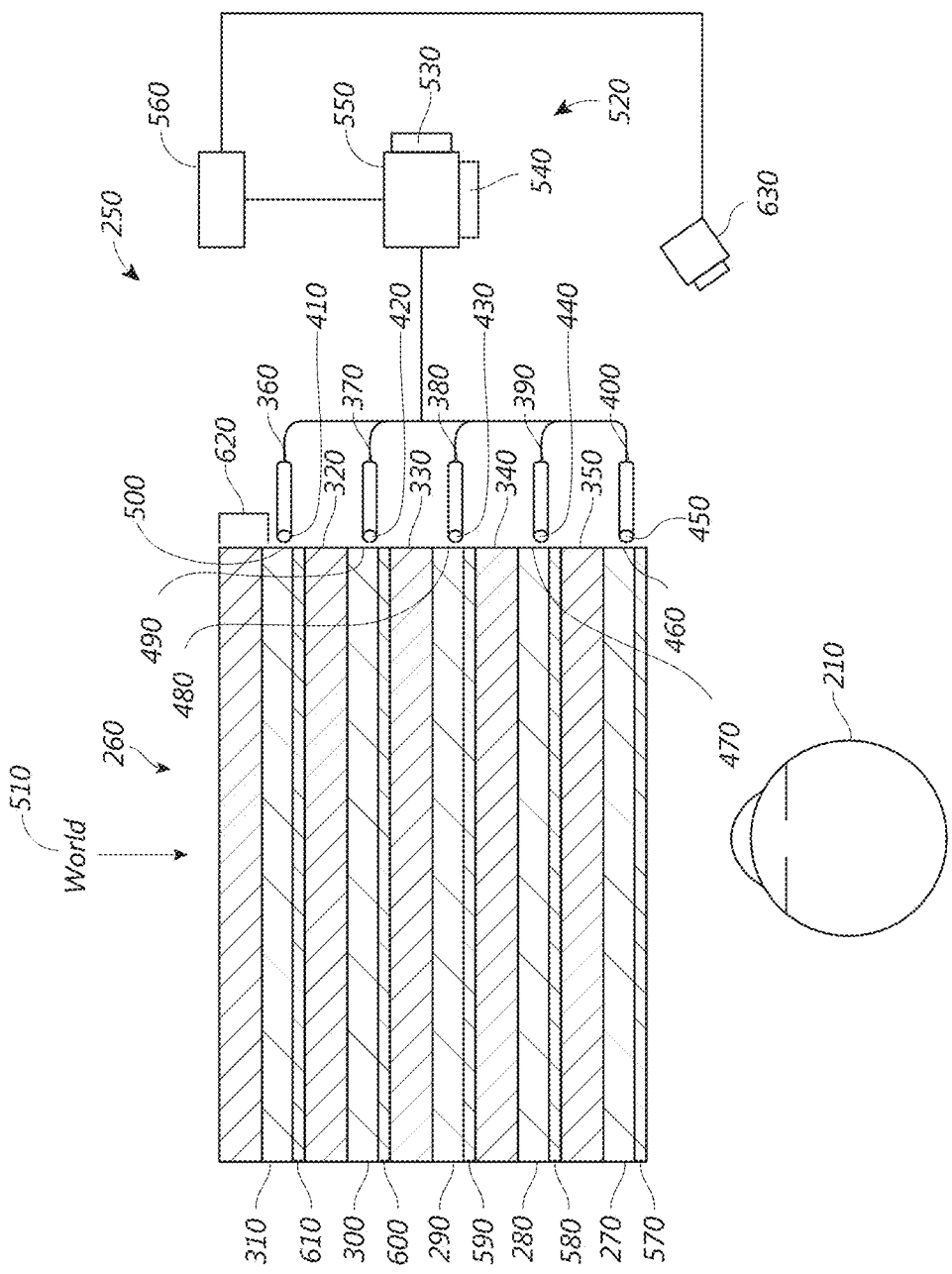
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the surfaces of the waveguide between which the thickness of the waveguide extends. In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
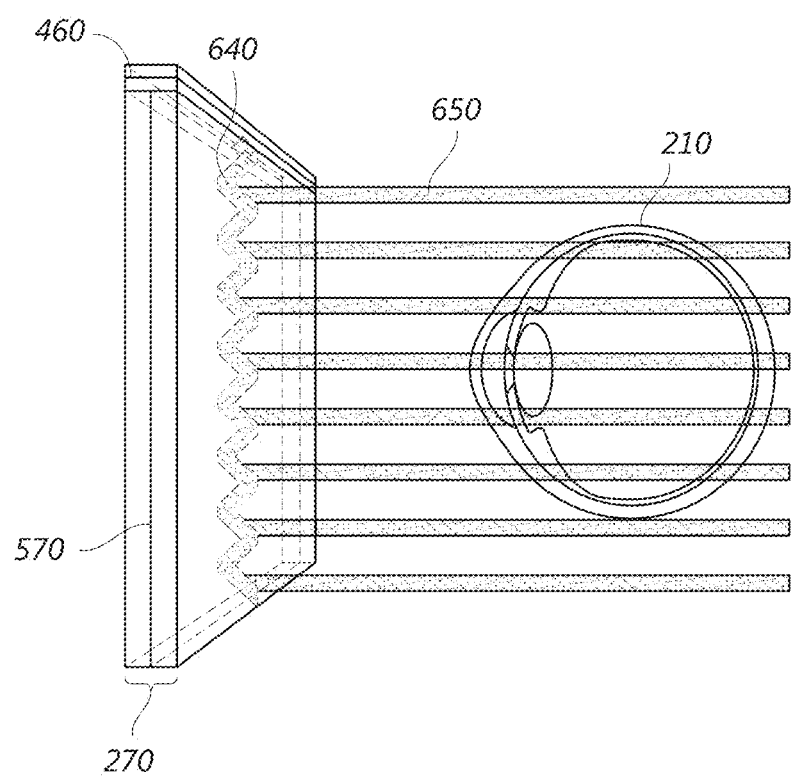
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
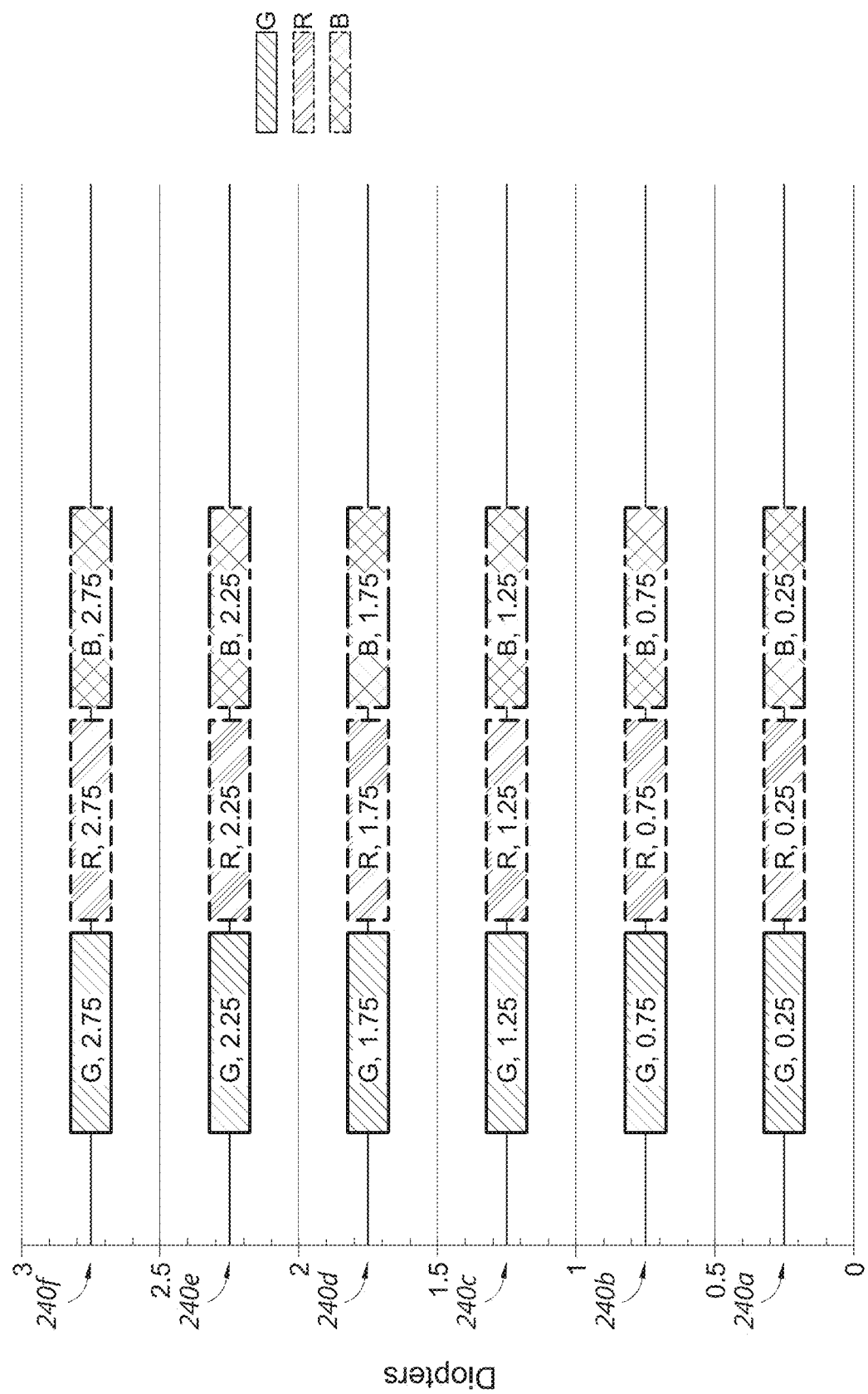
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
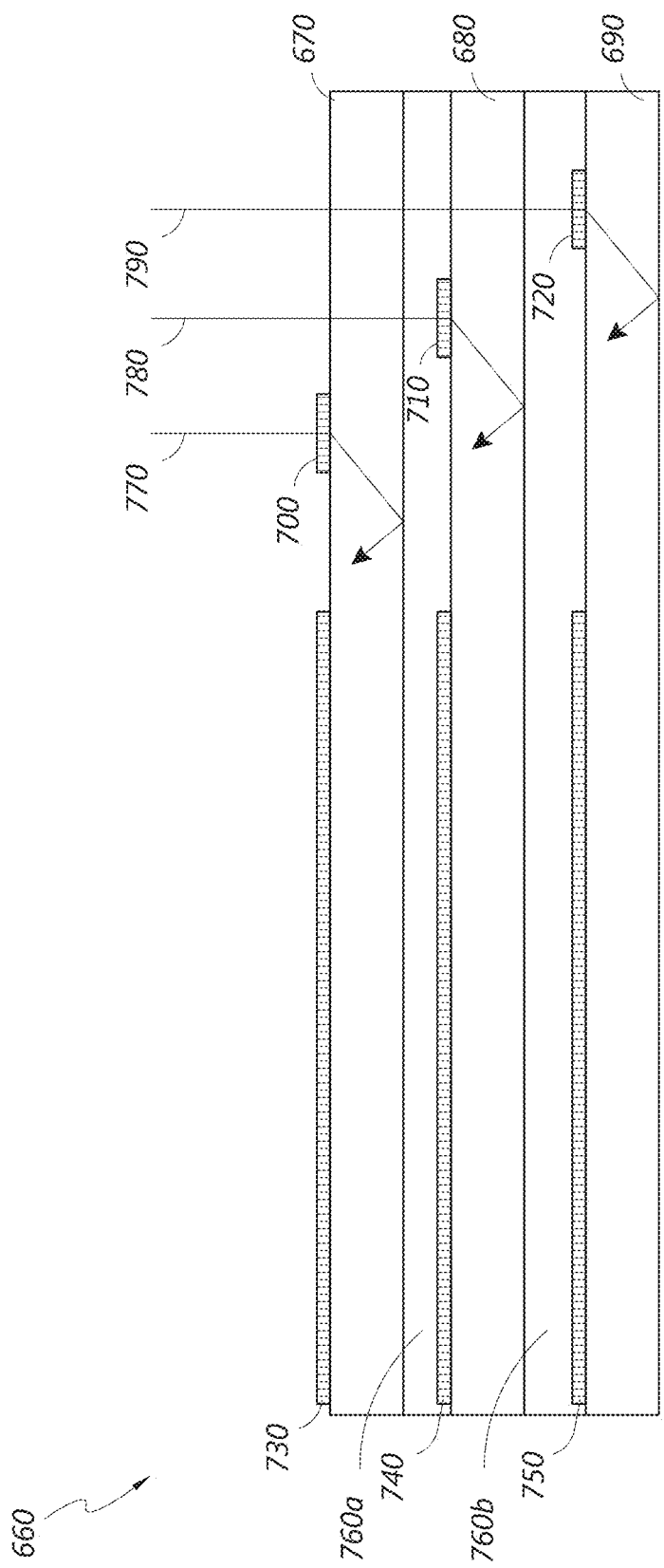
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The incoupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
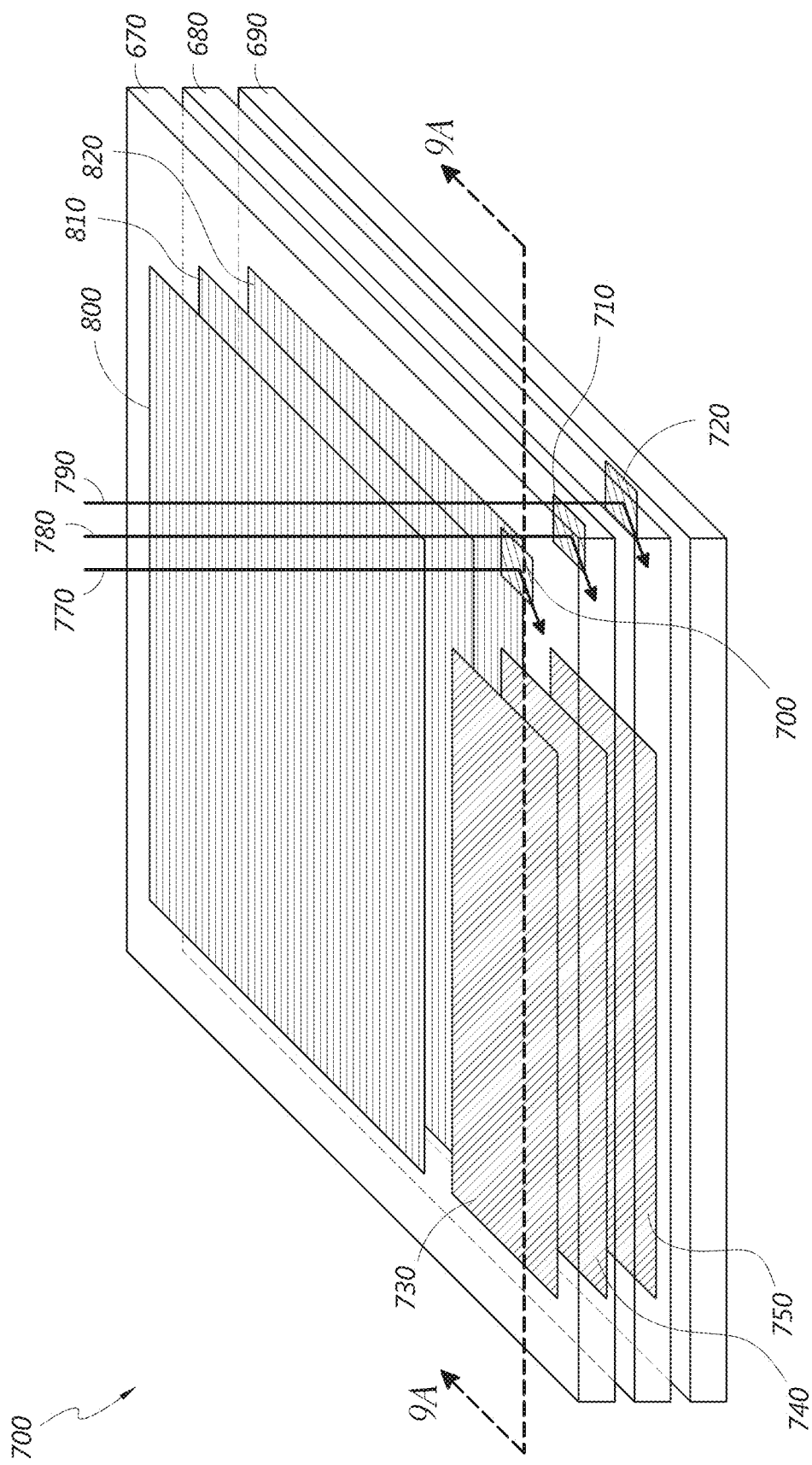
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
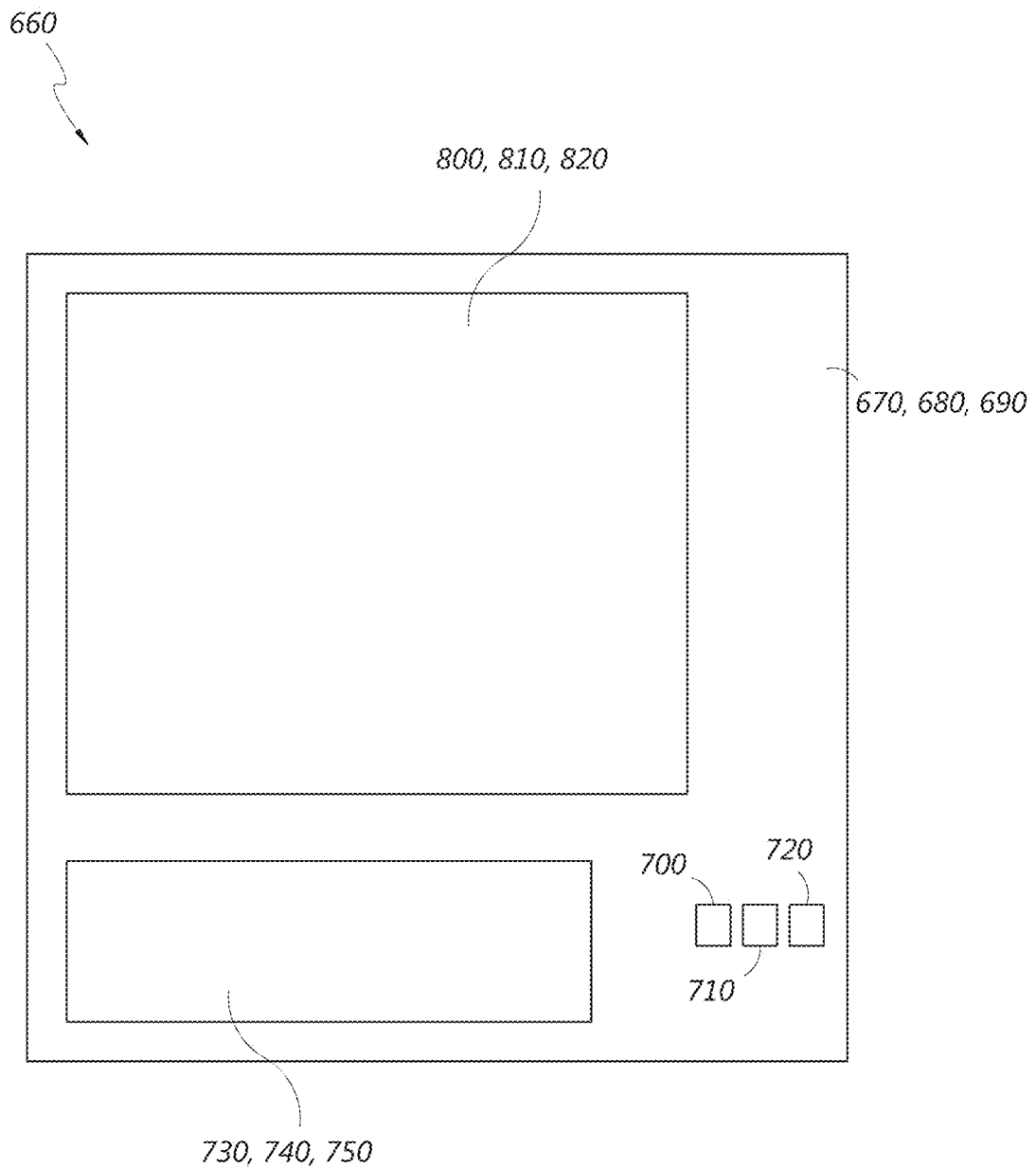
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
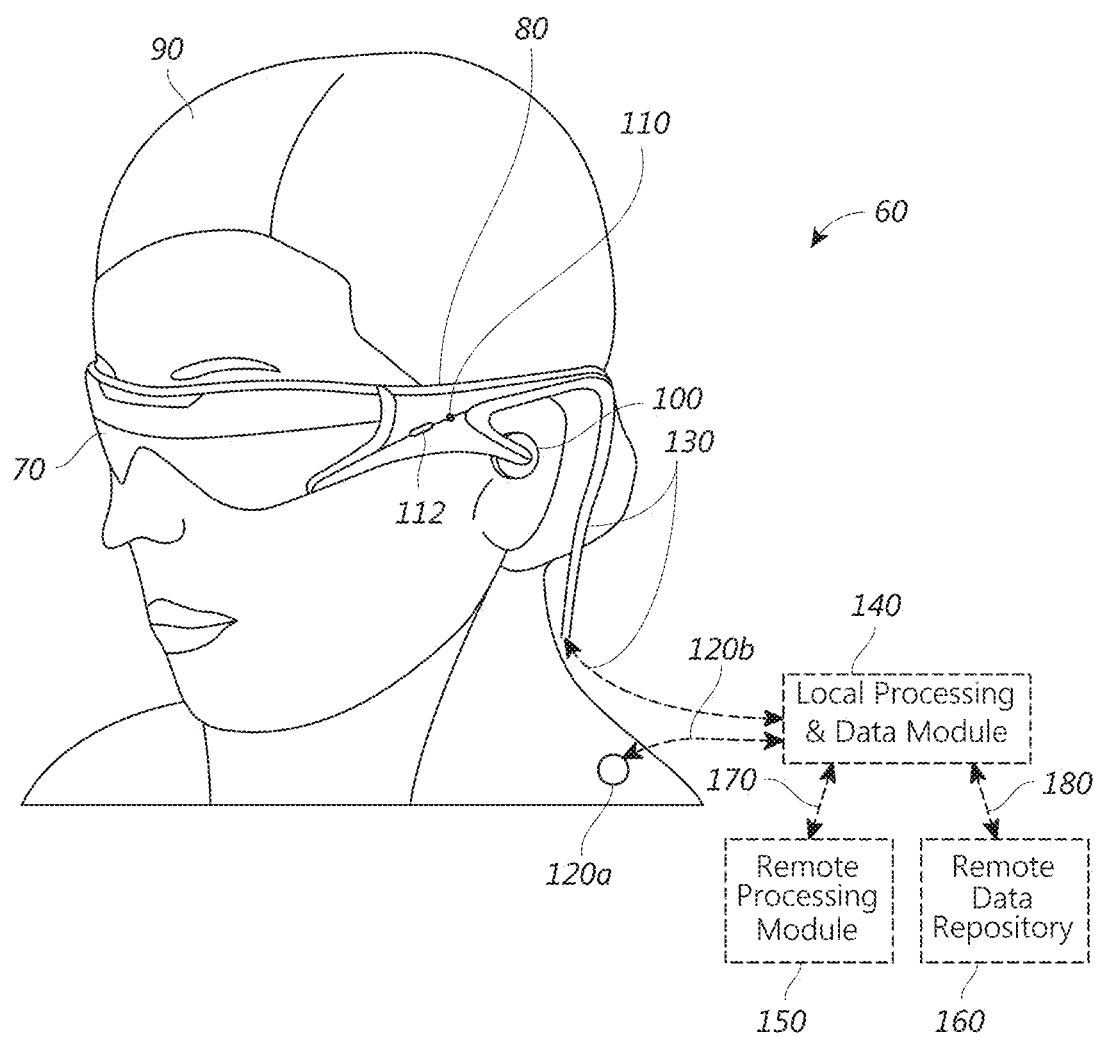
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing a physiological state of the user 90 in some embodiments. For example, the sensor 120*a* may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Hybrid Waveguide Structures

Figure 10:
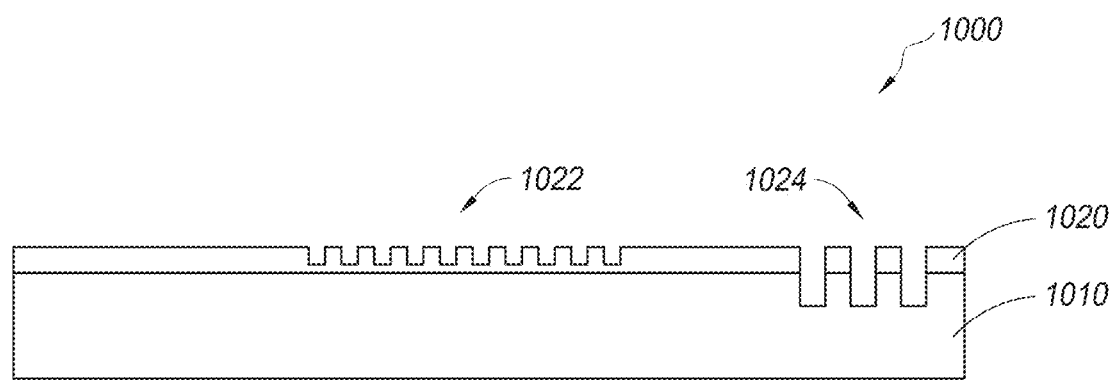
FIG. 10 illustrates an example of a hybrid waveguide with a core layer and an auxiliary layer.

Referring now to FIG. 10, an example of a hybrid waveguide with a core layer and an auxiliary layer is illustrated. Hybrid waveguide 1000 includes a relatively thick core layer 1010 on which a relatively thin auxiliary layer 1020 is disposed; that is, the core layer 1010 is thicker than the overlying auxiliary layer 1020. In some embodiments, the core layer 1010 may have a thickness of between about 50 µm and about 1000 µm, including between about 100 µm and about 1000 µm, between about 300 µm and about 800 µm, between about 300 µm and about 500 µm, and between about 310 µm and about 450 µm. In some environments, the auxiliary layer may have a thickness of between about 5 nm and about 5000 nm (about 0.01 µm to about 5 µm), including between about 50 nm and about 5000 nm, between about 10 nm and about 3000 nm, between about 20 nm and about 1000 nm, between about 30 nm and about 400 nm, and between about 50 nm and about 300 nm. Preferably, the core layer is sufficiently thick to facilitate the propagation of light across the hybrid waveguide 1000 by total internal reflection, and the auxiliary layer is sufficiently thick to allow the formation of diffractive optical elements therein. For example, the auxiliary layer is preferably at least as thick as the tallest diffractive optical element formed therein. In some embodiments, the core layer 1010 directly contacts the auxiliary layer 1020.

The core layer 1010 and the auxiliary layer 1020 may be formed of different materials. Preferably, the material forming the core layer 1010 is highly transparent to wavelengths of light in the visible spectrum, e.g., 390-700 nm. For example, the core layer 1010 preferably transmits greater than 85%, greater than 90%, or greater than 96% of the light, in the visible light spectrum, across its thickness. In some embodiments, the requirements for transparency for the auxiliary layer 1020, per unit volume, may be relaxed in comparison to that of the core layer 1010, due to auxiliary layer 1020 being thinner than the core layer 1010. For example, the auxiliary layer 1020 may be formed of a material that provides lower transparency in the visible spectrum than the core layer 1010; that is, for the same material thickness, the auxiliary layer 1020 may transmit less light than the core layer 1010. However, the material forming the auxiliary layer 1020 may have a different refractive index than the material forming the core layer 1010, particularly where material of the core layer 1010 extends into the indentations of nanophotonic structures formed in the auxiliary layer 1020. In some embodiments, the material forming auxiliary layer 1020 has a refractive index that differs from the refractive index of the material forming the core layer 1010 by about 0.05 or more, about 0.1 or more, or about 0.2 or more.

In some embodiments, the core layer 1010 may be formed of a highly transparent polymer material, e.g., an organic polymer material, and the auxiliary layer 1020 may be formed of a different polymer material (e.g., a different organic or inorganic polymer material) or a hybrid organic/inorganic material. Examples of high refractive index materials (e.g., having a refractive index higher than 1.65), which may be used for the core layer 1010 in some embodiments, include polyimide-based high index resins, halogen-containing (e.g., bromine or iodine-containing) polymers, phosphorous containing polymers, thiol-ene based polymers, and high refractive index resin materials. Examples of high refractive index resin materials include those commercially available from NTT-AT of Kawasaki-shi, Kanagawa, Japan, such as the high refractive index resins sold under the name #565 and #566; and high refractive index resin materials commercially available from Akron Polymer System of Akron, Ohio, USA, such as the high refractive index resins sold under the name APS-1000, APS2004, APS-4001, and as part of the APS 3000 series.

Examples of lower refractive index materials (e.g., having a refractive index lower than 1.65), such materials as for the auxiliary layer 1020 in some embodiments, include organic polymer materials, low refractive index resins, sol-gel based hybrid polymers (e.g., $TiO_2$, $ZrO_2$, and ITO sol-gel materials), polymers doped with nanoparticles (such as $TiO_2$, $ZrO_2$), and active materials (e.g., polymers doped with quantum dots). Examples of low refractive index organic polymer materials include those commercially available from Sigma-Aldrich of St. Louis, Missouri, USA, such as the polymer material sold under the names CPS 1040 UV, CPS1040 UV-A, CPS1030, CPS 1020UV, CPS 1040UV-VIS, CPS 1030 UV-VIS, and CPS 1020 UV-VIS. Examples of low refractive index resins include those commercially available from Miwon of the Nagase Group, Osaka, Japan.

Figure 11:
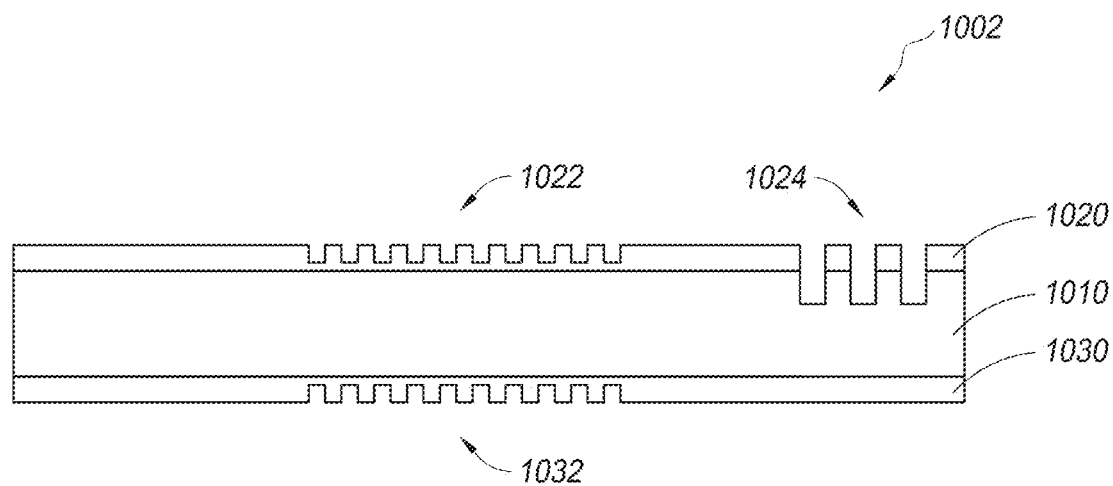
FIG. 11 illustrates an example of a hybrid waveguide with a core layer and multiple auxiliary layers.

With continued reference to FIG. 10, one or more nanophotonic structures 1022, 1024 may be provided in the auxiliary layer 1020. The nanophotonic structures 1022, 1024 comprise lines of material and intervening indentations or open volumes. As illustrated, the nanophotonic structures 1022, 1024 may include features that extend partially or completely through the auxiliary layer 1020. In some embodiments, the nanophotonic structures 1024 may extend into the underlying core layer 1010, thereby forming features having higher aspect ratios than possible using only the thickness of the auxiliary layer 1020. With reference now to FIG. 11, an example of a hybrid waveguide with a core layer and multiple auxiliary layers is illustrated. The illustrated hybrid waveguide 1002 is similar to the hybrid waveguide 1000 of FIG. 10, except that an additional auxiliary layer 1030 is provided on an opposite side of the core layer 1010 from the auxiliary layer 1020. As illustrated, both opposing major surfaces of the core layer 1010 may directly contact one of the auxiliary layers 1020, 1030.

The additional auxiliary layer 1030 may be similar to the auxiliary layer 1020 and, for example, is preferably formed of a different material from the core layer 1010 and preferably has a higher refractive index than that core layer 1010. In some embodiments, auxiliary layer 1030 may be formed of the same material as the auxiliary layer 1020. In some other embodiments, the auxiliary layers 1020 and 1030 may be formed of different materials.

One or more nanophotonic structures may be provided in the auxiliary layer 1030. In the illustrated example, a single nanophotonic structure 1032 is shown. The nanophotonic structure 1032 may be similar to the nanophotonic structures 1022, 1024, and may take the form of localized volumes of material and intervening indentations or open volumes. The openings may extend partially through the auxiliary layer 1030, as illustrated. In some other embodiments, the openings defining the nanophotonic structure 1032 may extend completely through the auxiliary layer 1030 and, optionally, into the underlying core layer 1010. Advantageously, providing nanophotonic structures on opposing surfaces of the core layer 1010 can effectively increase the number of nanophotonic structures across a given area of the core layer 1010, thereby, e.g., increasing the amount of light outcoupled or incoupled into the waveguide 1004 across that area.

Figure 12:
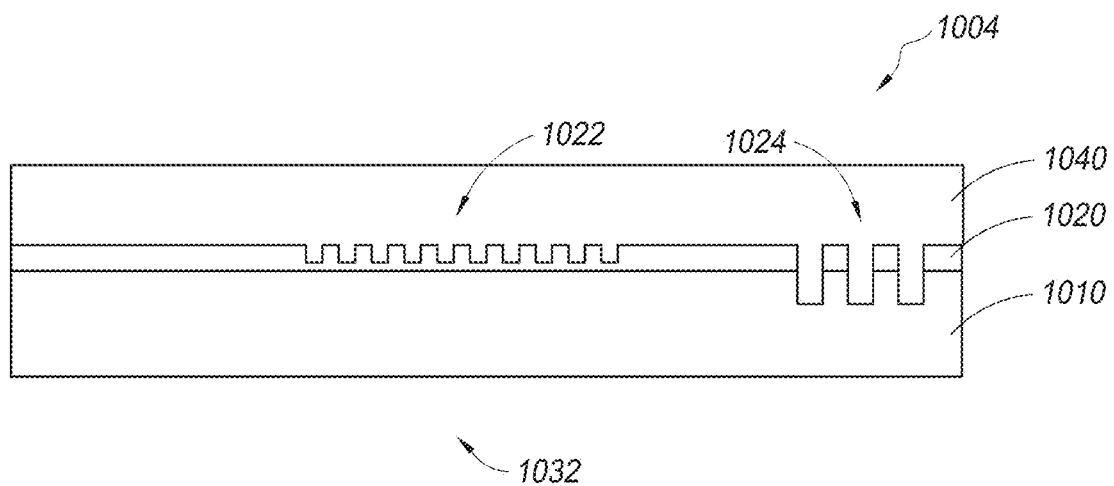
FIG. 12 illustrates an example of a hybrid waveguide with multiple core layers and an auxiliary layer.

With reference now to FIG. 12, an example of a hybrid waveguide with multiple core layers and an auxiliary layer as illustrated. The illustrated hybrid waveguide 1004 is similar to the hybrid waveguide 1000 of FIG. 10, except that an additional core layer 1040 is provided on an opposite side of the auxiliary layer 1020 from the core layer 1010. Each of the opposing major surfaces of the auxiliary layer 1020 may directly contact a corresponding one of the core layers 1010, 1040. As discussed above regarding FIG. 10, the auxiliary layer 1020 may include one or more nanophotonic structures 1020, 1024. It will be appreciated that the additional core layer 1040 may increase the overall thickness of the waveguide 1004 relative to the waveguide 1000, thereby facilitating the lateral propagation of light across the length of the waveguide. In addition, light propagating laterally through the waveguide 1004 may strike a nanophotonic structure twice (e.g., once after reflecting off a major surface of the core layer 1040 and once after reflecting off a major surface of the core layer 1010), which can increase the efficiency of the nanophotonic structure for, e.g., out coupling light from the waveguide 1004.

As illustrated, the nanophotonic structures 1022 may include a plurality of indentations in the auxiliary layer 1020 and those indentations may be filled by material of the overlying additional core layer 1040. The refractive indices of the auxiliary layer 1020 and the additional core layer 1040 are preferably selected to be different to support the optical functionality of the nanophotonic structures 1022. As discussed herein, the refractive indices of the auxiliary layer 1020 and the additional core layer 1040 differ by about 0.05 or more, about 0.1 or more, or about 0.2 or more in some embodiments. In addition, in embodiments in which the nanophotonic structures 1024 has indentations that extend into the core layer 1010 and are filled by material of the additional core layer 1040, the material of the additional core layer 1040 may also have a different refractive index than that of the core layer 1010. For example, the refractive indices of the additional core layer 1040 and the core layer 1010 may differ by about 0.05 or more, about 0.1 or more, or about 0.2 or more in such embodiments.

Figure 13:
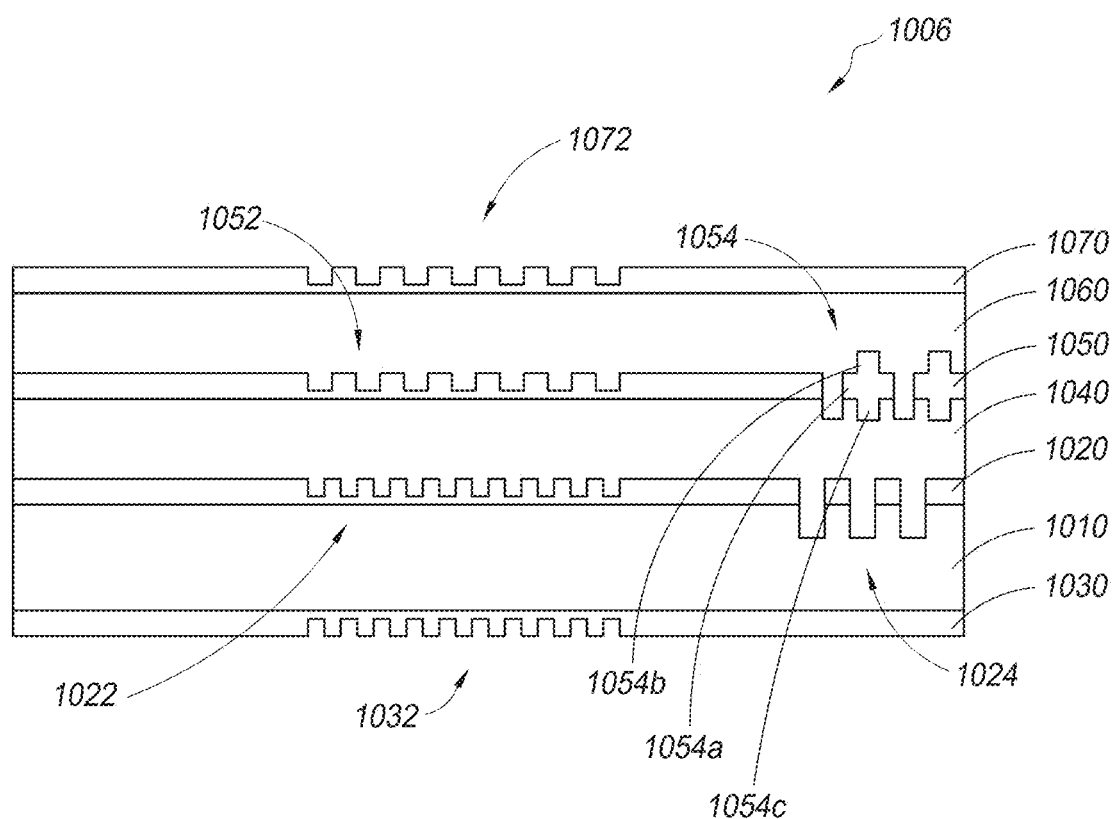
FIG. 13 illustrates an example of a hybrid waveguide with multiple core layers and multiple auxiliary layers.

With reference now to FIG. 13, an example of a hybrid waveguide with multiple core layers and multiple auxiliary layers is illustrated. The illustrated hybrid waveguide 1004 is similar to the hybrid waveguide 1002 of FIG. 11, except the auxiliary layer 1020 is overlaid by the additional core layer 1040, which is overlaid by a third auxiliary layer 1050, which is overlaid by a third core layer 1060, which is overlaid by a fourth auxiliary layer 1070.

Each of the auxiliary layers 1030, 1020, 1050, 1070 may comprise one or more nanophotonic structures. For example, the auxiliary layer 1050 may comprise nanophotonic structures 1052, 1054, and the auxiliary layer 1070 may comprise the nanophotonic structures 1072. In some embodiments, the nanophotonic structures may be multitiered structures. For example, the nanophotonic structure 1054 is a multitiered structure having a baseline tier 1054a and an upper tier 1054b and a lower tier 1054c. As illustrated, material of a given core layer may extend into openings defining the nanophotonic structures in immediately neighboring auxiliary and/or core layers.

It will be appreciated that the sizes, shapes, and/or periodicity of features forming the various nanophotonic structures 1022, 1032, 1052, 1072, 1024, 1054 may be different. For example, the physical dimensions and patterns made out by the features may be selected to achieve desired light redirecting functionality for a given wavelength or color of light. In some embodiments, where the hybrid waveguide 1006 includes multiple nanophotonic structures at different levels, the nanophotonic structures at each level may be selected to redirect light of different wavelengths, different incident angles, and/or output light towards different directions. In the aggregate, the different nanophotonic structures may provide a broader band response, over a larger range of wavelengths, incident angles, and/or output directions than a waveguide with a single or more limited number of nanophotonic structures.

Figure 14:
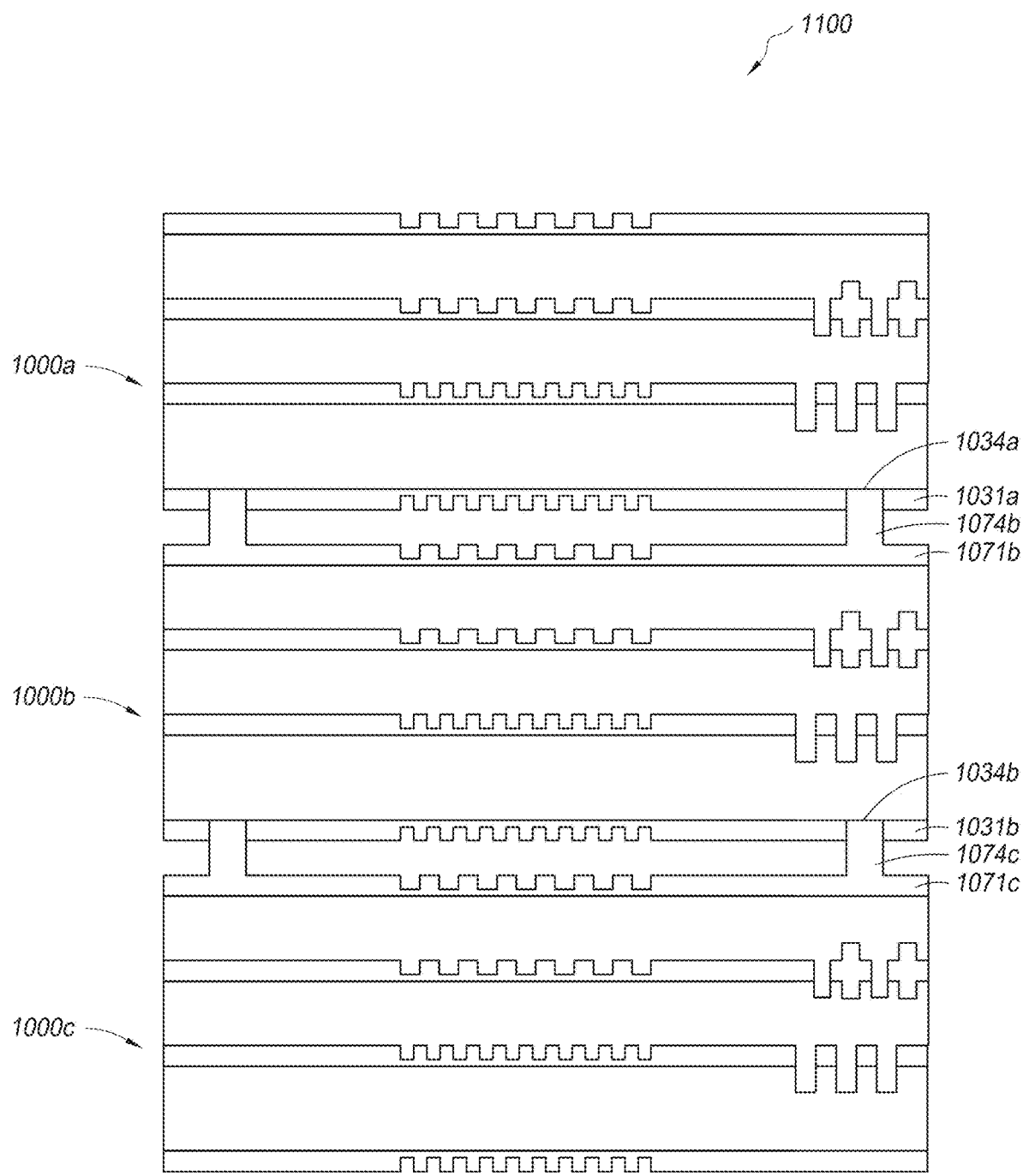
FIG. 14 illustrates an example of a stack of hybrid waveguides.

FIG. 14 illustrates an example of a stack of hybrid waveguides. Hybrid waveguide 1000a is stacked over hybrid waveguide 1000b, which is stacked over hybrid waveguide 1000c. Each of the hybrid waveguides 1000a, 1000b, 1000c may correspond to one of the hybrid waveguides 1000, 1002, 1004, 1006 (FIGS. 10-13, respectively). In some embodiments, the various hybrid waveguides 1000a, 1000b, 1000c may be similar to one another, or may have a different structure. For example, as illustrated, the hybrid waveguides 1000a, 1000b, 1000c may each be similar to the hybrid waveguide 1006 (FIG. 13).

In some embodiments, the nanophotonic structures in the auxiliary layers of the various hybrid waveguides 1000a, 1000b, 1000c may differ. For example, the nanophotonic structures in each of the hybrid waveguides 1000a, 1000b, 1000c may be configured to redirect light of one color (corresponding to one wavelength or a range of wavelengths), while nanophotonic structures of other ones of the hybrid waveguides 1000a, 1000b, 1000c may be configured to redirect light of other different colors. In some embodiments, the hybrid waveguides 1000a, 1000b, 1000c may be configured to redirect light with wavelengths corresponding to the colors red, blue, and green, respectively.

To facilitate the stacking and the alignment of the hybrid waveguides, spacers may be provided between the waveguides. Optionally, at each interface between hybrid waveguides, the spacers may be provided as part of one hybrid waveguide and a matching opening, into which the spacers may fit, may be provided in the other hybrid waveguide at that interface. For example, with continued reference to FIG. 14, the hybrid waveguide 1000c may include a plurality of spacers 1074c and the directly overlying and interfacing hybrid waveguide 1000b may include a plurality of openings 1034b into which the spacers 1074c may be accommodated on a one-to-one basis. In some embodiments, the spacers and the openings may be formed in auxiliary layers. For example, the spacers 1074c may be formed in the auxiliary layer 1071c and the openings 1034b may be formed in the auxiliary layer 1031b. Similarly, the spacers 1074b may be formed in the auxiliary layer 1071b and the openings 1034a may be formed in the auxiliary layer 1031a. In some embodiments, the spacers are sufficiently tall to space apart two hybrid waveguides and form a gap (e.g., an air gap) between individual ones of the hybrid waveguides 1000a, 1000b, 1000c. It will be appreciated that the gap provides a low refractive index volume which can facilitate the redirection of light by the nanophotonic structures and the propagation of light through each hybrid waveguide.

Referring to FIGS. 10-14 generally, it will be appreciated that the various materials for the core and auxiliary layers 1010, 1040, 1060 and 1030, 1020, 1050, 1070 are generally as described above for the core layer 1010 and auxiliary layer 1020, respectively, although the specific material may be the same, or may be different. For example, in some embodiments, the material forming the outer auxiliary layers 1030, 1070 may be selected for hardness and mechanical stability, while these properties may be relaxed for the auxiliary layers 1020, 1050 such that those layers 1020, 1050 may be formed of materials that are less hard and/or mechanically stable. Each of illustrated layers may directly contact a directly neighboring layer. To support the ability of the nanophotonic structures to turn our redirect light, the material forming the auxiliary layer preferably has a refractive index that is different from the refractive index of the material forming an immediately adjacent core layers (e.g., a core layer in which material from the core layer extends directly into openings in the nanophotonic structures). Preferably, the refractive indices differ by about 0.05 or more, about 0.1 or more, or about 0.2 or more.

Any of the hybrid waveguides 1000, 1002, 1004, 1006, or combinations thereof, may be utilized as one of the waveguides of the waveguide stacks 260 (FIG. 6) or 660 (FIGS. 9A-9C), e.g., as one of the waveguides 270, 280, 290, 300 or 310 (FIG. 6) or 670, 680, or 690 (FIGS. 9A-9C). In addition, in some embodiments, some of the nanophotonic structures 1022, 1032, 1052, 1072, 1024, 1054 may correspond to the incoupling optical elements 700, 710, 720 (FIGS. 9A-9C), and others of the nanophotonic structures 1022, 1032, 1052, 1072, 1024, 1054 may correspond to the light distributing elements 730, 740, 750 and/or out-coupling optical elements 800, 810, 820 (FIGS. 9A-9C). For example, the nanophotonic structures 1024, 1054 may correspond to the incoupling optical elements 700, 710, 720 and the nanophotonic structures 1022, 1032, 1052, 1072 may correspond to the light distributing elements 730, 740, 750 and/or out-coupling optical elements 800, 810, 820.

Example Methods of Making Hybrid Waveguides

In some embodiments, the core and auxiliary layers may be formed using flowable materials, without vapor deposition. In addition, patterns (e.g., patterns defining nanophotonic structures) may be formed during the formation of the core and/or auxiliary layer, without separate patterning and etch processes. For example, the nanophotonic structures may be formed by imprinting and subsequently hardening or curing of the imprinted material.

FIGS. 15a-15e illustrate a method of forming a hybrid waveguide with a core layer and an auxiliary layer. With reference to FIG. 15a, a pair of molds 1200, 1202 is provided. The mold 1202 comprises a pattern of raised features 1232, which may be the negative of a desired nanophotonic structure pattern to be defined in the auxiliary layer to be formed. A mass of material 1230 for forming the auxiliary layer is deposited on the mold 1202.

With reference to FIG. 15b, the molds 1200, 1202 are brought together to compress the material 1230, thereby forming the auxiliary layer 1030. The compressed material 1230 may be subjected to a curing process (e.g., exposure to UV light) to harden that material to form a solid auxiliary layer 1030. As illustrated, the negative pattern 1232 defines the nanophotonic structures 1032. It will be appreciated that additional negative patterns may be provided on the mold 1202 to form an additional nanophotonic structures as desired.

With reference to FIG. 15c, the molds 1200, 1202 are moved apart relative to one another and a mass of material 1210 for forming the core layer is deposited on the auxiliary layer 1030. With reference to FIG. 15d, the molds 1200, 1202 are moved closer together to compress the mass of material 1210, thereby forming the core layer 1010. The compressed material 1210 may be subjected to a curing process (e.g., exposure to UV light), which hardens that material to form a solid core layer 1030. With reference to FIG. 15e, the molds 1200, 1202 are moved apart relative to one another and the core layer 1010 and the auxiliary layer 1030 are released from the molds, thereby forming the hybrid waveguide 1000.

FIGS. 16a-16d illustrate another method of forming a hybrid waveguide with a core layer and an auxiliary layer. Unlike the method of FIGS. 15a-15e, the materials forming the core layers and auxiliary layers are cured together rather than separately.

Figure 16A:
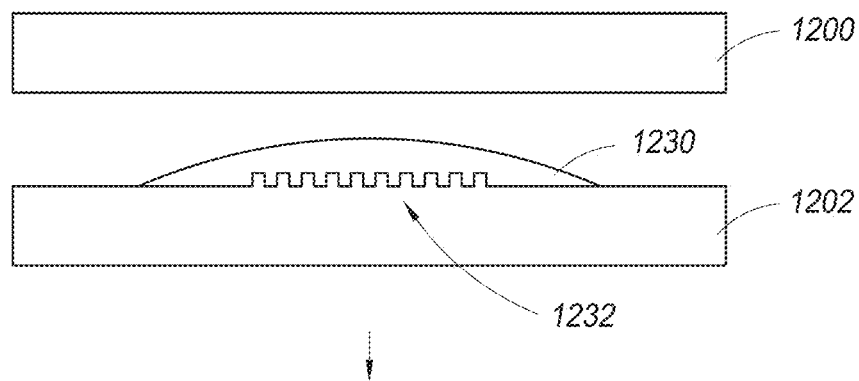
FIGS. 16a-16d illustrate another method of forming a hybrid waveguide with a core layer and an auxiliary layer.
Figure 16B:
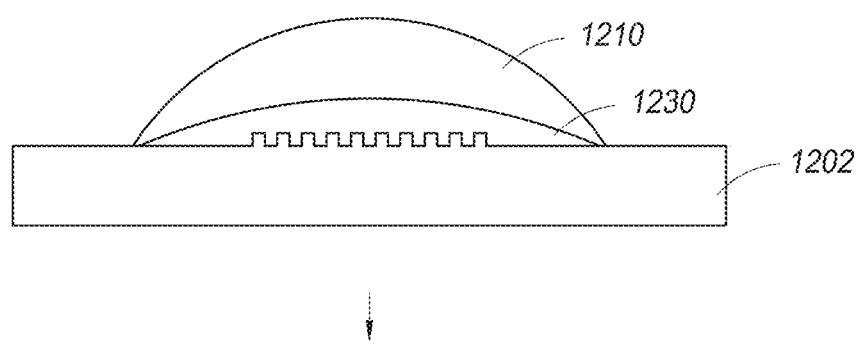
Figure 16C:
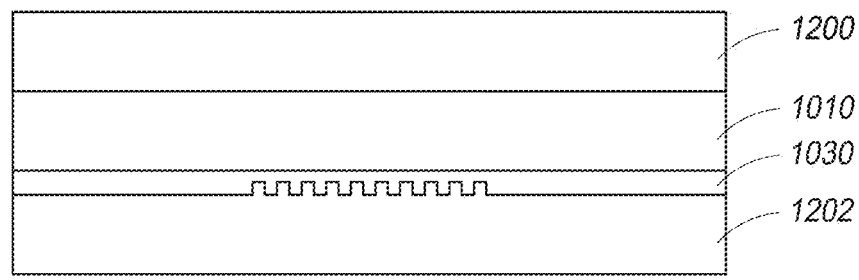
Figure 16D:
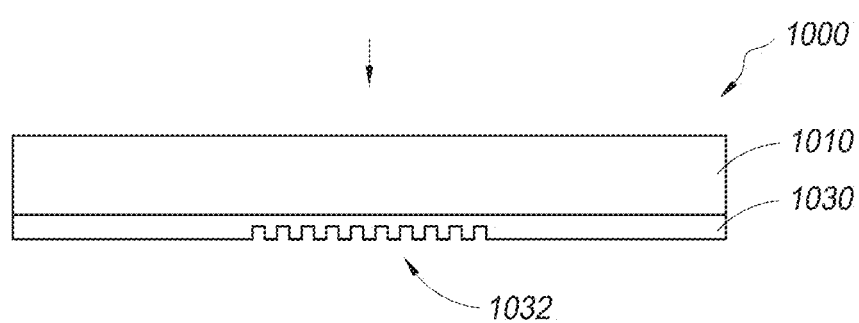

With reference to FIG. 16a, the pair of molds 1200, 1202 is provided, with the mold 1202 comprising a pattern of raised features 1232 for forming a nanophotonic structure pattern in the auxiliary layer to be formed. The mass of material 1230 for forming the auxiliary layer is subsequently deposited on the mold 1202. With reference to FIG. 16b, the mass of material 1210 for forming the core layer is deposited on the mass of material 1230 for forming the auxiliary layer. Preferably, the materials forming the masses 1230, 1210 are immiscible to guard against intermixing of those materials. With reference to FIG. 16c, the molds 1200, 1202 are moved closer together to simultaneously compress the masses of materials 1210, 1230, thereby forming the core layer 1010 and the auxiliary layer 1030 simultaneously. The compressed materials 1210, 1230 may be subjected to a curing process (e.g., by exposure to UV light), which hardens those materials to form a solid core layer 1010 and a solid auxiliary layer 1030, respectively. With reference to FIG. 16d, the molds 1200, 1202 are removed and the core layer 1010 and the auxiliary layer 1030 are released from the molds to form the hybrid waveguide 1000.

Figure 17A:
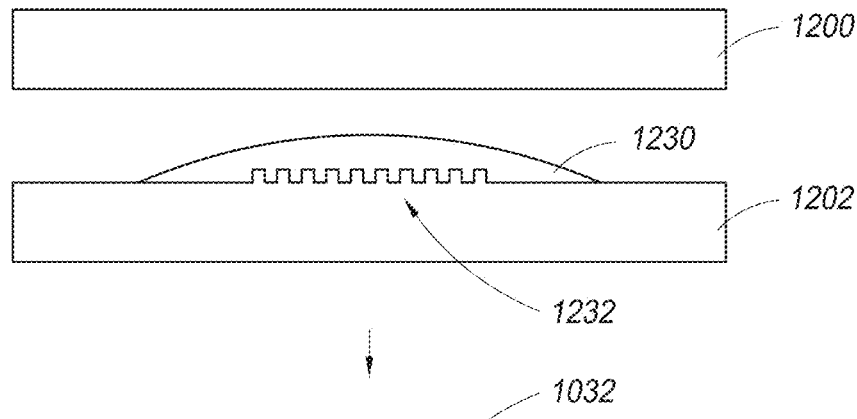
FIGS. 17a-17g illustrate a method of forming a hybrid waveguide with a core layer and multiple auxiliary layers.
Figure 17B:
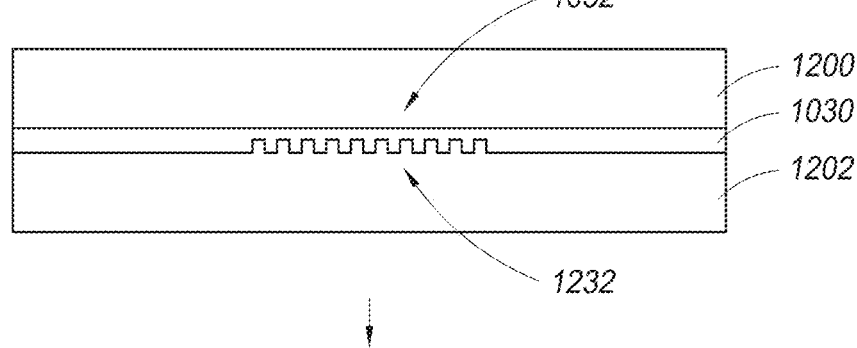
Figure 17C:
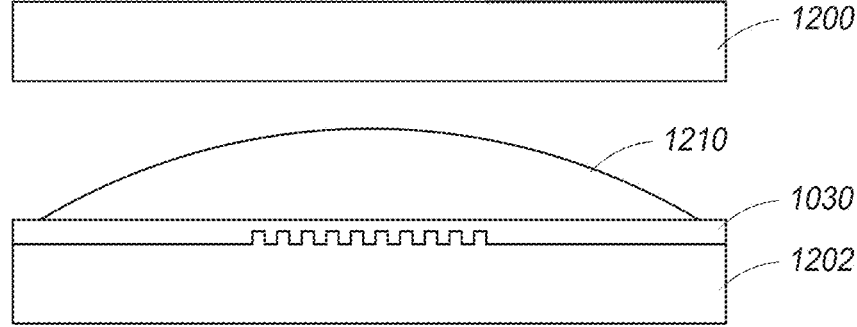
Figure 17D:
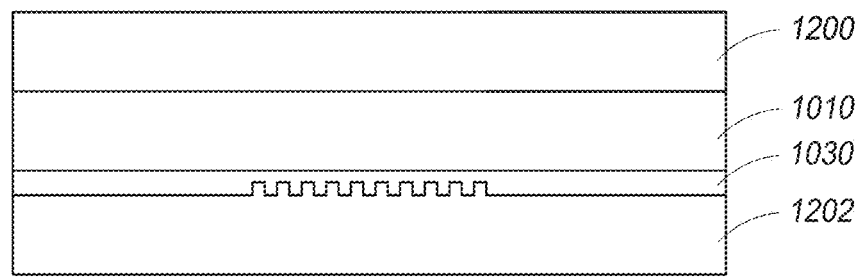
Figure 17E:
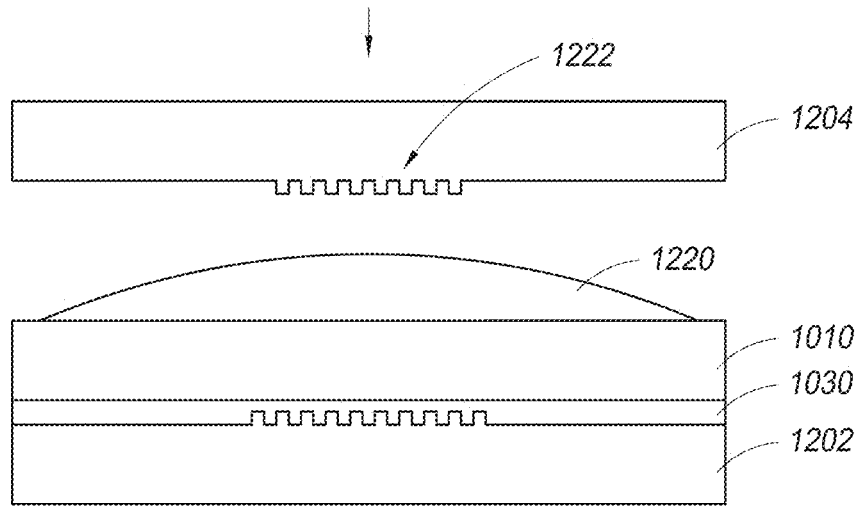
Figure 17F:
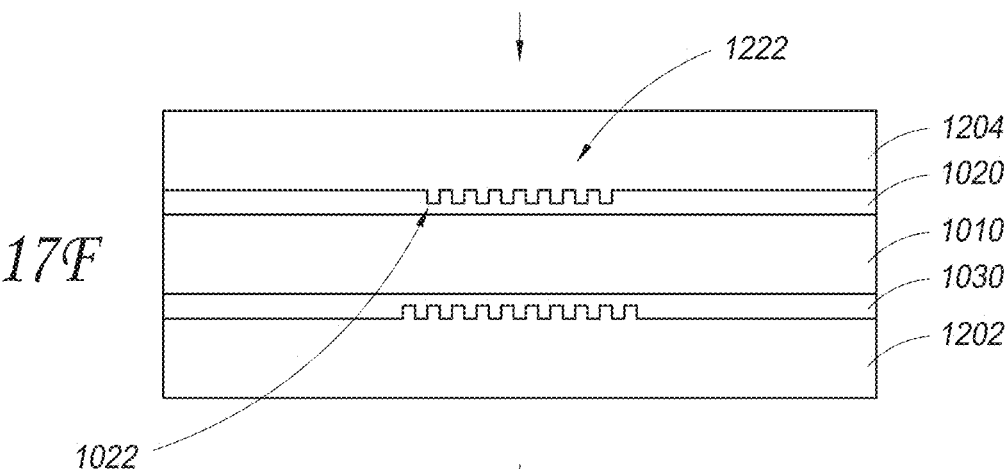
Figure 17G:
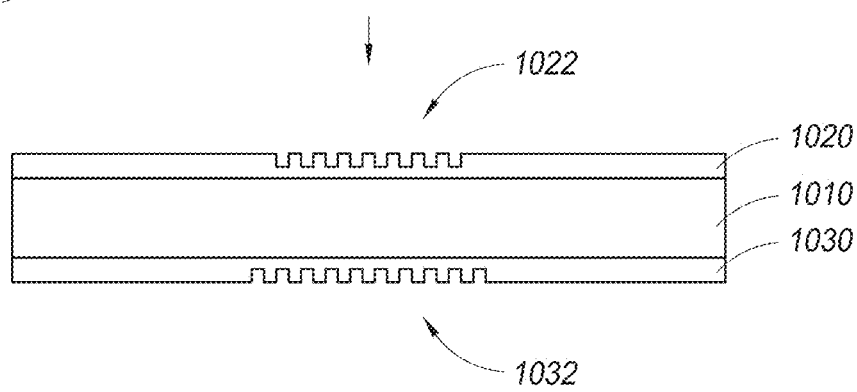

FIGS. 17a-17g illustrate a method of forming a hybrid waveguide with a core layer and multiple auxiliary layers. FIGS. 17a-17d progress as described above for FIGS. 15a-15d. With reference to FIG. 17e, the molds 1200, 1202 are moved apart relative to one another and the mold 1200 is replaced with another mode 1204. The mold 1204 includes a pattern of protrusions 1222 for defining nanophotonic structures in an addition auxiliary layer. An additional mass of material 1220 for forming the additional auxiliary layer is deposited on the core layer 1010. With reference to FIG. 17f, the molds 1204, 1202 are moved closer together to compress the mass of material 1220 to form the auxiliary layer 1220. It will be appreciated that the pattern of features 1222 imprints the desired nanophotonic structure 1022 in the auxiliary layer 1020. The compressed material 1220 may be subjected to a curing process to harden that material to form the auxiliary layer 1020. With reference to FIG. 17g, the molds 1204, 1202 are moved apart and a hybrid waveguide comprising the core layer 1010 and the auxiliary layers 1030, 1020 is released from the molds.

FIGS. 18a-18d illustrate a method of forming a hybrid waveguide with a patterned core layer and an auxiliary layer. It will be appreciated, that in some embodiments, the mold in contact with the core layer comprises a patterned surface 1222' for defining nanophotonic structures in the core layer. The method illustrated in FIGS. 18a-18d proceeds in the same manner as that described above for FIGS. 16a-16d except that the mold 1200 is replaced with a mold 1204' having a pattern of protrusions 1222' for patterning features in the core layer. Consequently, when the molds 1202, 1204' are brought together to compress the masses of material 1230, 1210, the mold 1204 imprints a nanophotonic structure 1022' into the core layer 1010'. The masses of material 1230, 1210 are cured to form the core layer 1010' and the auxiliary layer 1030. The molds 1202, 1204' are subsequently moved apart and a hybrid waveguide this released. The hybrid waveguide comprises the auxiliary layer 1030 and the core layer 1010' having the nanophotonic structure 1022'.

In some other embodiments, the mass of material 1230 for forming the auxiliary layer 1030 may be compressed using a flat mold such as the mold 1200 (not shown) and cured before depositing the mass of material 1210 on the auxiliary layer 1030. The overlying mold may subsequently be replaced with the mold 1204' to print the nanophotonic structure 1022' into mass of material 1210.

Figure 19A:
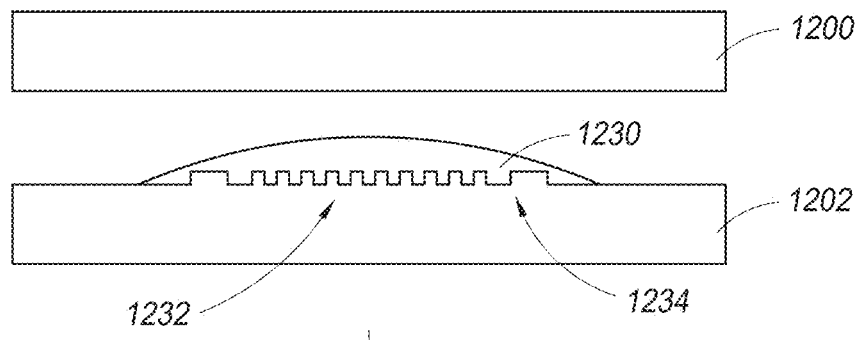
FIGS. 19a-19g illustrate a method of forming a hybrid waveguide with integral spacers.
Figure 19B:
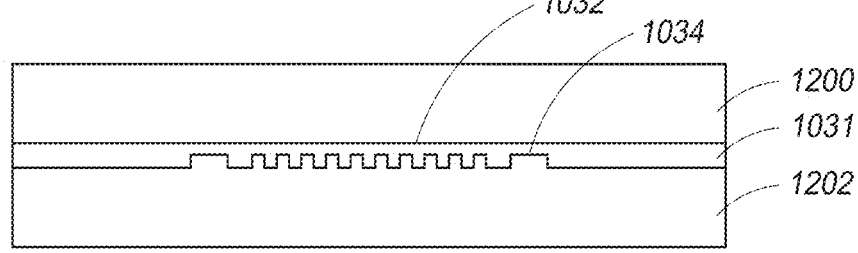
Figure 19C:
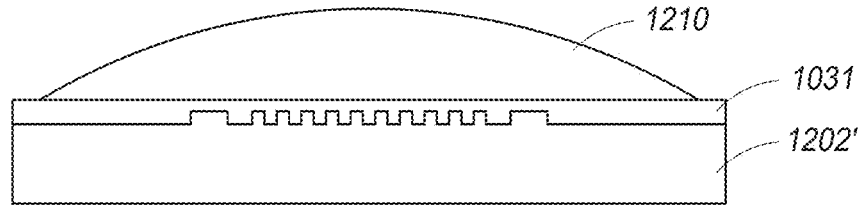
Figure 19D:
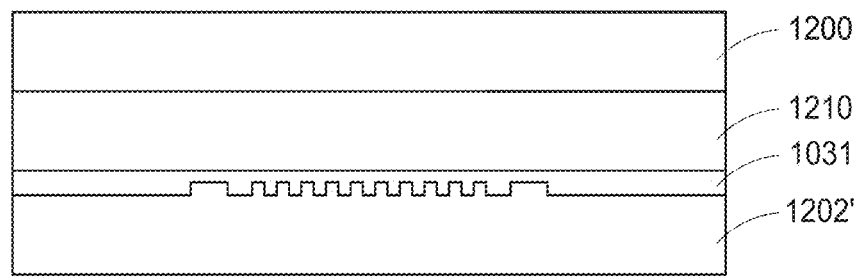
Figure 19E:
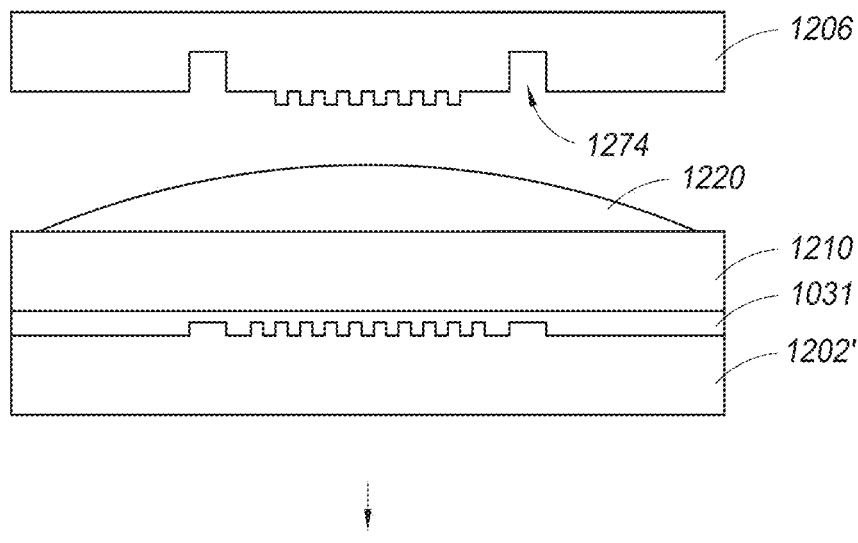
Figure 19F:
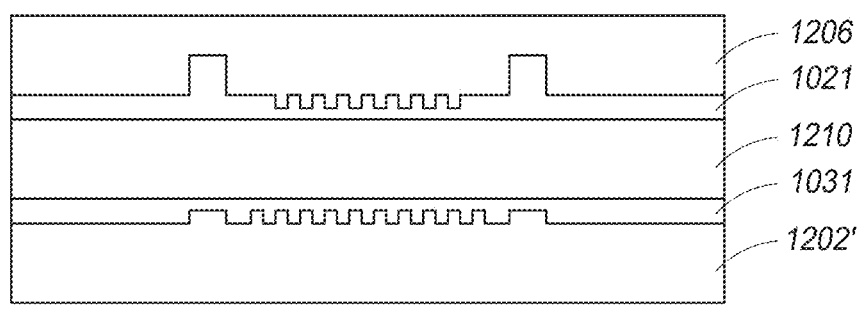
Figure 19G:
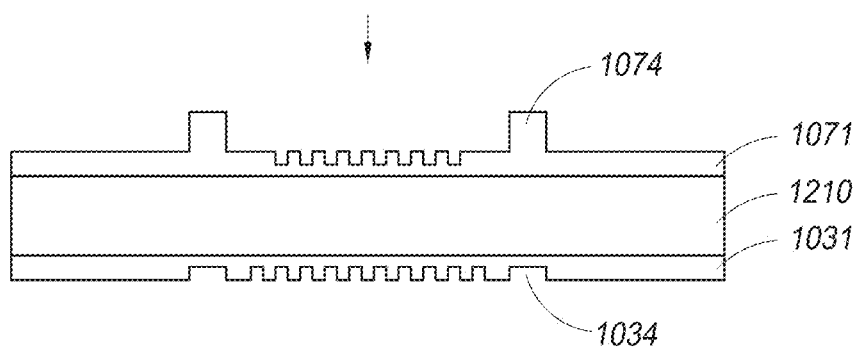

FIGS. 19a-19d illustrate a method of forming a hybrid waveguide with integral spacers. The method illustrated in FIGS. 19a-19d is similar to that discussed herein regarding FIGS. 17a-17d except that the mold 1202' replaces the mode 1202 and includes vertically protruding features for defining the open volumes 1034 in the auxiliary layer 1031 to be formed. It will be appreciated the open volumes are sized, shaped, and located to accommodate vertically extending spacers from another waveguide. With reference to FIG. 19e, the molds 1200, 1202' are separated and the mold 1200 is replaced with another mold 1206, which may include a pattern of openings 1274 for defining spacers in an overlying auxiliary layer. The additional mass of material 1220 for forming the overlying auxiliary layer is deposited on the core layer 1210. With reference to FIG. 17f, the molds 1206, 1202 are moved closer together and compress the mass of material 1220 to form the auxiliary layer 1021. Subsequently, the resulting structure is cured to harden the auxiliary layer 1021. With reference to FIG. 19g, the molds 1206, 1202 are moved apart and a hybrid waveguide comprising the core layer 1210 and the auxiliary layers 1071, 1031 are released from the molds, thereby forming a hybrid waveguide having spacers 1074 and openings 1034 for receiving spacers from other waveguides.

With reference to FIGS. 15a-19g generally, it will be appreciated that deposited materials deposited on materials forming other auxiliary or core layers preferably have sufficient wettability to allow the deposit materials to maintain contact and possibly spread over the underlying layer of material. In addition, it will be appreciated that additional layers of material may be formed on the illustrated layers of material by depositing masses of material, compressing that material, and curing that material. In addition, nanophotonic structures may be formed in these additional layers using an appropriate mode to imprint the nanophotonic structures into the layers before curing those layers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways.

All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. An augmented reality display system comprising:
   a waveguide comprising:
      an optically transmissive core layer having a major surface opposite an other major surface; and
      an optically transmissive auxiliary layer on the major surface, the auxiliary layer comprising:
         incoupling diffractive optical elements configured to direct, into the waveguide, at least a portion of light that is incident on the incoupling diffractive optical elements such that the directed light propagates in the waveguide; and
         outcoupling diffractive optical elements configured to extract, out of the waveguide, incoupled light that is propagating in the waveguide,
         wherein the auxiliary layer is thinner than the core layer and is formed of a material different from material forming the core layer,
      wherein the material forming the core layer has a refractive index greater than 1.65, and
      wherein at least one of the incoupling diffractive optical elements or the outcoupling diffractive optical elements include nanophotonic structures comprising lines of material and intervening indentations that are arranged between the lines of material and that extend completely through the auxiliary layer and partially into the core layer.

2. The augmented reality display system of claim 1, wherein the core layer and the auxiliary layer are each formed of a polymer or a resin.

3. The augmented reality display system of claim 1, wherein material forming the auxiliary layer has a refractive index differing by about 0.05 or more from the refractive index of material forming the core layer.

4. The augmented reality display system of claim 1, wherein the core layer has a thickness of 100-5000 µm, and the auxiliary layer has a thickness of between 0.01-5 µm.

5. The augmented reality display system of claim 1, further comprising an additional auxiliary layer thinner than the core layer and immediately adjacent the other major surface.

6. The augmented reality display system of claim 5, wherein the additional auxiliary layer comprises additional outcoupling diffractive optical elements configured to extract incoupled modulated light out of the waveguide.

7. The augmented reality display system of claim 1, further comprising an additional core layer disposed on an opposite side of the auxiliary layer from the core layer.

8. The augmented reality display system of claim 1, further comprising a plurality of core layers alternating with auxiliary layers thinner than the core layers, the auxiliary layers formed of material different from the core layers.

9. The augmented reality display system of claim 8, wherein the core layers are formed of a same material.

10. The augmented reality display system of claim 9, wherein the auxiliary layers are formed of a same material.

11. The augmented reality display system of claim 8, wherein one or more of the auxiliary layers comprise optical gratings different from one or more other auxiliary layers.

12. The augmented reality display system of claim 1, further comprising a spatial light modulator configured to output modulated light comprising image information, wherein the spatial light modulator is arranged to output the modulated light to be incident on the incoupling diffractive optical elements to be directed into the waveguide.

13. The augmented reality display system of claim 1, wherein the one or more nanophotonic structures include other intervening indentations that extend partially into the auxiliary layer and that do not extend into the core layer.

14. The augmented reality display system of claim 1, wherein the material forming the core layer has a refractive index greater than 1.7.

15. The augmented reality display system of claim 1, wherein the material forming the core layer has a refractive index greater than 1.8.

16. The augmented reality display system of claim 1, wherein the incoupling diffractive optical elements include a first set of nanophotonic structures comprising the lines of material and the intervening indentations that are arranged between the lines of material and that extend completely through the auxiliary layer and partially into the core layer, and wherein the outcoupling diffractive optical elements include a second set of nanophotonic structures comprising lines of material and intervening indentations that are arranged between the lines of material and that extend partially into the auxiliary layer and that do not extend into the core layer.

17. The augmented reality display system of claim 1, wherein the outcoupling diffractive optical elements include a first set of nanophotonic structures comprising the lines of material and the intervening indentations that are arranged between the lines of material and that extend completely through the auxiliary layer and partially into the core layer, and wherein the incoupling diffractive optical elements include a second set of nanophotonic structures comprising lines of material and intervening indentations that are arranged between the lines of material and that extend partially into the auxiliary layer and that do not extend into the core layer.

18. The augmented reality display system of claim 1, wherein the waveguide further comprises an additional optically transmissive auxiliary layer on the other major surface, the additional auxiliary layer comprising one or more additional diffractive optical elements that include one or more of:
- additional incoupling diffractive optical elements configured to direct, into the waveguide, at least a portion of light that is incident on the additional incoupling diffractive optical elements such that the directed light propagates in the waveguide; or
- additional outcoupling diffractive optical elements configured to extract, out of the waveguide, incoupled light that is propagating in the waveguide.

19. The augmented reality display system of claim 1, wherein the waveguide further comprises an additional core layer on an opposite side of the auxiliary layer from the core layer.

* * * * *